(12) United States Patent
Mizuguchi

(10) Patent No.: US 12,255,547 B2
(45) Date of Patent: Mar. 18, 2025

(54) POWER CONVERSION SYSTEM

(71) Applicant: KABUSHIKI KAISHA TOYOTA JIDOSHOKKI, Kariya (JP)

(72) Inventor: Daiki Mizuguchi, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 198 days.

(21) Appl. No.: 18/121,639

(22) Filed: Mar. 15, 2023

(65) Prior Publication Data
US 2023/0318487 A1 Oct. 5, 2023

(30) Foreign Application Priority Data

Mar. 30, 2022 (JP) .................. 2022-057050

(51) Int. Cl.
*H02M 7/537* (2006.01)
*H02J 7/00* (2006.01)
*H02M 1/00* (2006.01)
*H02M 1/38* (2007.01)
*H02P 27/06* (2006.01)

(52) U.S. Cl.
CPC ............ *H02M 7/537* (2013.01); *H02J 7/007* (2013.01); *H02M 1/0003* (2021.05); *H02M 1/385* (2021.05); *H02P 27/06* (2013.01)

(58) Field of Classification Search
CPC .... H02M 7/537; H02M 1/385; H02M 1/0003; H02J 7/007; H02P 27/06
See application file for complete search history.

(56) References Cited

U.S. PATENT DOCUMENTS

| | | | | |
|---|---|---|---|---|
| 2017/0324316 A1* | 11/2017 | Araki | .................. | H02M 7/5387 |
| 2018/0138844 A1* | 5/2018 | Harada | ............... | H02P 29/0241 |
| 2018/0367070 A1* | 12/2018 | Ichikawa | ................ | B24B 47/12 |
| 2019/0115863 A1* | 4/2019 | Nawa | .................. | H02M 7/5395 |
| 2021/0091585 A1* | 3/2021 | Takamatsu | ............. | H02P 27/08 |

FOREIGN PATENT DOCUMENTS

JP 2016-123202 A 7/2016

\* cited by examiner

*Primary Examiner* — Adolf D Berhane
(74) *Attorney, Agent, or Firm* — Sughrue Mion, PLLC

(57) ABSTRACT

In discharging of electric power in a smoothing capacitor arranged between a battery and an inverter provided with three-phase power modules, a control circuit alternately and periodically switches between all-phase upper on control and all-phase lower on control. With a power module in which a current flows in a direction from a motor toward the inverter among the three-phase power modules being defined as a negative current module and a power module in which a current flows in a direction from the inverter toward the motor being defined as a positive current module, during a period during which switching between all-phase lower on control and all-phase upper on control is made, the control circuit performs, for a prescribed time period, discharging processing for setting the negative current module to the lower on state and for setting the positive current module to the upper on state.

7 Claims, 31 Drawing Sheets

PATTERN 1
MODE A

PATTERN 1
MODE B

PATTERN 1
MODE C

PATTERN 2
MODE A

PATTERN 2
MODE B

PATTERN 2
MODE C

PATTERN 3
MODE A

PATTERN 3
MODE B

PATTERN 3
MODE C

PATTERN 4
MODE A

PATTERN 4
MODE B

PATTERN 4
MODE C

PATTERN 5
MODE A

PATTERN 5
MODE B

PATTERN 5
MODE C

PATTERN 6
MODE A

PATTERN 6
MODE B

PATTERN 6
MODE C

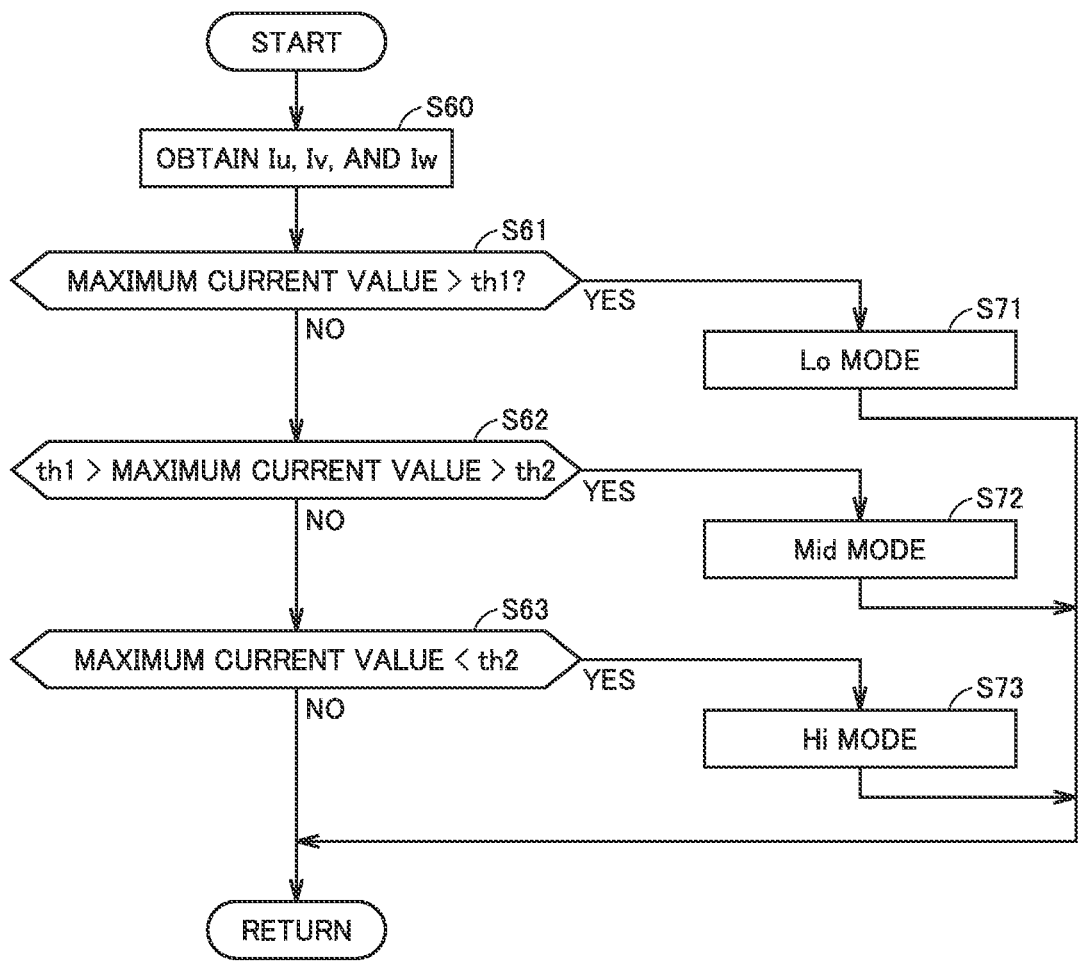

POWER CONVERSION SYSTEM

This nonprovisional application is based on Japanese Patent Application No. 2022-057050 filed with the Japan Patent Office on Mar. 30, 2022, the entire contents of which are hereby incorporated by reference.

BACKGROUND

Field

The present disclosure relates to a technique to discharge electric power stored in a smoothing capacitor provided in a power conversion system.

Description of the Background Art

In general, a power conversion system provided in an electrically powered vehicle includes an inverter that converts electric power between a battery and a motor and a smoothing capacitor that smoothens voltage variation between the inverter and the battery. In such a power conversion system, electric power stored in the smoothing capacitor is desirably discharged early when a vehicle stops operating or a fault occurs.

For example, Japanese Patent Laying-Open No. 2016-123202 discloses an exemplary technique for discharging of a smoothing capacitor. A power conversion system disclosed in Japanese Patent Laying-Open No. 2016-123202 includes an inverter that converts electric power between a battery and a motor, a smoothing capacitor arranged between the inverter and the battery, and a control circuit that controls the inverter. The inverter includes three-phase power modules. Each of the three-phase power modules includes an upper switching element and a lower switching element and two diodes connected in anti-parallel to the upper switching element and the lower switching element, respectively. In discharging of electric power in the smoothing capacitor, the control circuit has electric power stored in the smoothing capacitor consumed by periodically switching between all-phase upper on control in which all power modules are set to an upper on state (a state in which the upper switching element is on and the lower switching element is off) and all-phase lower on control in which all power modules are set to a lower on state (a state in which the upper switching element is off and the lower switching element is on). The control circuit sets an all-off period during which the upper switching element and the lower switching element in all power modules are set to off during a period during which switching between all-phase upper on control and all-phase lower on control is made.

SUMMARY

The control circuit disclosed in Japanese Patent Laying-Open No. 2016-123202 sets the all-off period during the period during which switching between all-phase upper on control and all-phase lower on control is made. There is such a concern, however, that, while the motor is being rotated by energy for travel of a vehicle during the all-off period, the smoothing capacitor is charged with regenerative power from the motor through the inverter, and under the influence thereof, electric power in the smoothing capacitor cannot be discharged early.

The present disclosure was made to solve the problems as described above, and an object thereof is to discharge a smoothing capacitor early without providing a dedicated discharging circuit.

A power conversion system according to the present disclosure includes an inverter that converts electric power between a battery and a motor including three-phase stator coils, a positive electrode line and a negative electrode line that connect the battery and the inverter to each other, a smoothing capacitor arranged between the positive electrode line and the negative electrode line, and a control circuit that controls the inverter. The inverter includes three-phase switching units connected in parallel to one another between the positive electrode line and the negative electrode line and connected to the respective three-phase stator coils. Each of the three-phase switching units includes an upper switching element and a lower switching element connected in series in an order from the positive electrode line to the negative electrode line and an upper diode and a lower diode connected in anti-parallel to the upper switching element and the lower switching element, respectively. In release of charges in the smoothing capacitor, the control circuit alternately and periodically switches all of the three-phase switching units between all-phase upper on control in which the upper switching element is on and the lower switching element is off and all-phase lower on control in which the upper switching element is off and the lower switching element is on. During a period during which switching from one to the other of the all-phase upper on control and the all-phase lower on control is made, the control circuit controls states of the upper switching element and lower switching element of each phase as being different from the states in the all-phase upper on control and the all-phase lower on control, and controls, in an initial stage and a final stage of the period during which the switching is made, states of the upper switching element and lower switching element to be set to a state in which both of the upper switching element and lower switching element of at least one phase are off and controls, during a period between the initial stage and the final stage, states of the upper switching element and lower switching element of all phases to be set to an upper on state in which the upper switching element is on and the lower switching element is off or to be set to a lower on state in which the upper switching element is off and the lower switching element is on.

According to the configuration, during discharging of the smoothing capacitor, switching between all-phase upper on control and all-phase lower on control is alternately and periodically made. During the period between the initial stage and the final stage of the period during which switching between all-phase lower on control and all-phase upper on control is made, in at least one phase, the upper switching element and lower switching element are controlled to the upper on state in which the upper switching element is on and the lower switching element is off or to the lower on state in which the upper switching element is off and the lower switching element is on. With this control, the smoothing capacitor is discharged even while the motor is being rotated with energy for travel of the vehicle. Consequently, the smoothing capacitor can be discharged early without a dedicated discharging circuit.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 31 is a flowchart (No. 2) of the control circuit.

DESCRIPTION OF THE PREFERRED EMBODIMENTS

Figure 1:
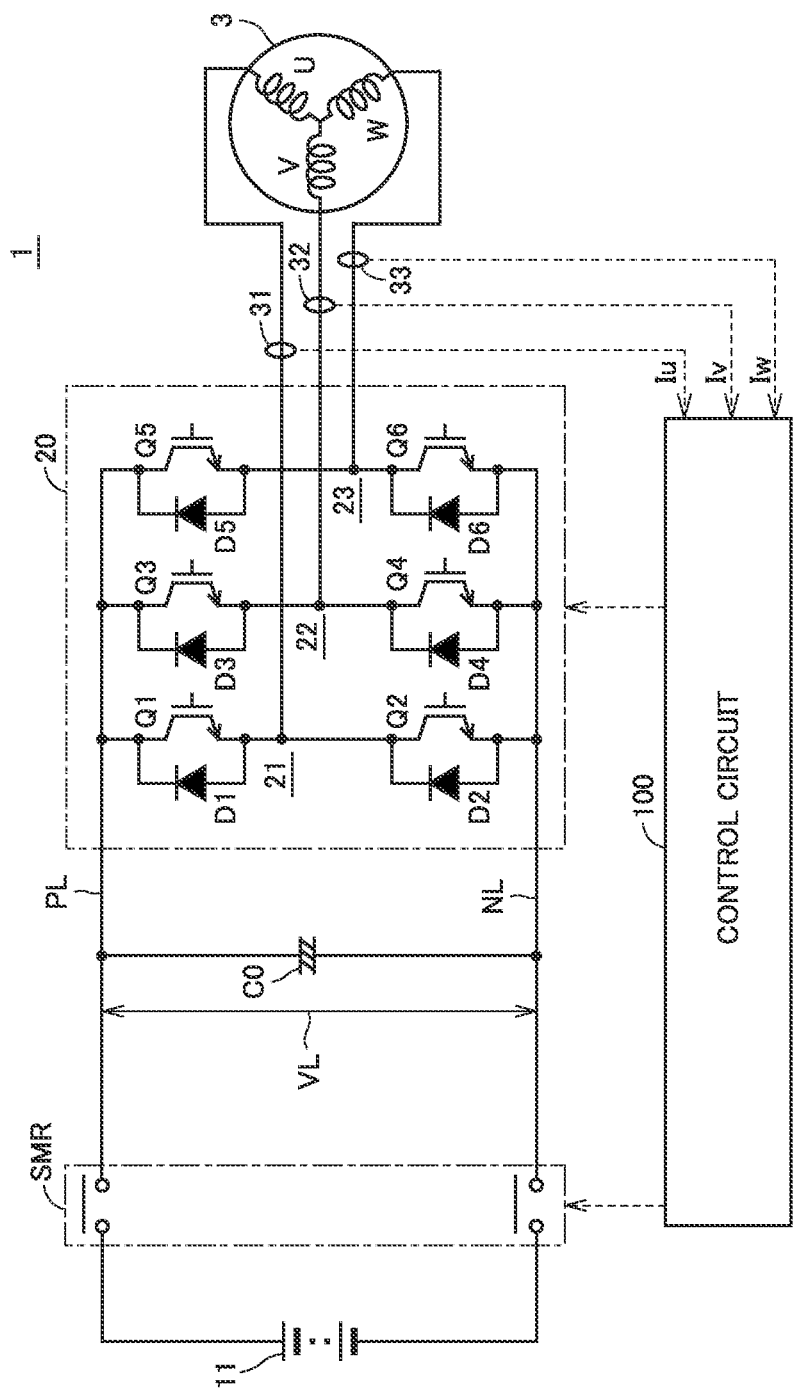
FIG. 1 is a diagram schematically showing an overall configuration of a power conversion system.

An embodiment of the present disclosure will be described in detail below with reference to the drawings. The same or corresponding elements in the drawings have the same reference characters allotted and description thereof will not be repeated.

<System Configuration>

FIG. 1 is a diagram schematically showing an overall configuration of a power conversion system 1 according to the present embodiment. Power conversion system 1 is mounted, for example, on a vehicle including a motor 3 as a drive power source.

Power conversion system 1 includes motor 3, a battery 11, a system main relay SMR, a positive electrode line PL, a negative electrode line NL, a smoothing capacitor C0, an inverter 20, current sensors 31 to 33, and a control circuit 100.

Battery 11 is a battery assembly including a plurality of cells. Each cell is a secondary battery such as a lithium ion battery or a nickel metal hydride battery. An output voltage from battery 11 has a high value, for example, around several hundred volts.

Positive electrode line PL electrically connects a positive electrode of battery 11 and inverter 20 to each other. Negative electrode line NL electrically connects a negative electrode of battery 11 and inverter 20 to each other.

System main relay SMR is electrically connected between battery 11 and inverter 20. System main relay SMR is closed in accordance with a command from control circuit 100. As system main relay SMR is closed, electric power can be transmitted between battery 11 and inverter 20.

Smoothing capacitor C0 is connected between positive electrode line PL and negative electrode line NL. Smoothing capacitor C0 smoothens an alternating-current (AC) component in voltage variation between positive electrode line PL and negative electrode line NL and supplies a smoothened direct-current (DC) voltage to inverter 20. A voltage VL between positive electrode line PL and negative electrode line NL matches with a voltage across opposing ends of smoothing capacitor C0. While system main relay SMR is closed, charges flow from battery 11 into smoothing capacitor C0 and the voltage (voltage VL) across opposing ends of smoothing capacitor C0 becomes an output voltage from battery 11.

Inverter 20 includes three power modules 21, 22, and 23 corresponding to a U phase, a V phase, and a W phase, respectively. Power modules 21, 22, and 23 are connected in parallel to one another between positive electrode line PL and negative electrode line NL. Each of power modules 21, 22, and 23 includes an upper switching element and a lower switching element connected in series in the order from positive electrode line PL to negative electrode line NL and two diodes connected in anti-parallel to the upper switching element and the lower switching element, respectively. Specifically, U-phase power module 21 includes an upper switching element Q1 and a lower switching element Q2 and diodes D1 and D2. V-phase power module 22 includes an upper switching element Q3 and a lower switching element Q4 and diodes D3 and D4. W-phase power module 23 includes an upper switching element Q5 and a lower switching element Q6 and diodes D5 and D6.

Each of switching elements Q1 to Q6 performs a switching operation (an on/off operation) in accordance with a drive signal from control circuit 100. An insulated gate bipolar transistor (IGBT), a power metal oxide semiconductor (MOS) transistor, or a power bipolar transistor can be employed as switching elements Q1 to Q6.

U-phase switching elements Q1 and Q2 are controlled to complementarily and alternately perform the switching operation. V-phase switching elements Q3 and Q4 are controlled to complementarily and alternately perform the switching operation. W-phase switching elements Q5 and Q6 are controlled to complementarily and alternately perform the switching operation.

Inverter 20 has switching elements Q1 to Q6 perform the switching operation to convert electric power between battery 11 and motor 3. When a torque command value for motor 3 is positive, inverter 20 converts DC power from battery 11 into AC power and supplies AC power to motor 3. Motor 3 is thus driven. During regenerative braking of vehicle 10, the torque command value for motor 3 is set to a negative value. In this case, inverter 20 converts AC power generated by motor 3 into DC power and supplies DC power to battery 11.

Motor 3 is a three-phase permanent magnet synchronous motor including three stator coils of the U phase, the V phase, and the W phase. The U-phase, V-phase, and W-phase stator coils have one ends connected in common to a neutral point. The U-phase, V-phase, and W-phase stator coils have the other ends connected to respective midpoints of power modules 21, 22, and 23 of inverter 20. Output torque from motor 3 is transmitted to a drive wheel through a power transmission gear (neither of which is shown) to cause vehicle 10 to travel. Motor 3 generates electric power with rotational force from the drive wheel (regeneration) during regenerative braking of vehicle 10.

Current sensor 31 detects a U-phase current Iu that flows from U-phase power module 21 of inverter 20 to motor 3. Current sensor 32 detects a V-phase current Iv that flows from V-phase power module 22 of inverter 20 to motor 3. Current sensor 33 detects a W-phase current Iw that flows from W-phase power module 23 of inverter 20 to motor 3. Each of current sensors 31 to 33 transmits a result of detection to control circuit 100.

U-phase current Iu, V-phase current Iv, and W-phase current Iw are each detected as a positive value (+) when they flow in a positive direction and detected as a negative value (—) when they flow in a negative direction, with a direction from inverter 20 toward motor 3 being defined as the positive direction and with a direction from motor 3 toward inverter 20 being defined as the negative direction. Since the total of U-phase current Iu, V-phase current Iv, and W-phase current Iw is 0, U-phase current Iu, V-phase current Iv, and W-phase current Iw satisfy such relation that, when any two values are determined, one remaining value is also determined. Therefore, one of current sensors 31, 32, and 33 does not have to be provided.

Control circuit 100 includes a processor such as a central processing unit (CPU), a memory such as a read only memory (ROM) and a random access memory (RAM), and a port for input and output of various signals (none of which is shown). Control circuit 100 controls system main relay SMR and inverter 20 based on a program and a map stored in the memory and a signal received from each sensor.

Control circuit 100 controls a drive state of motor 3 or charging and discharging of battery 11 by periodically switching between the upper on state (the state in which the upper switching element is on and the lower switching element is off) and the lower on state (the state in which the upper switching element is off and the lower switching element is on) in each phase of inverter 20.

Control circuit 100 controls the switching operation in each phase of inverter 20 under pulse width modulation (PWM) control. Under PWM control, a frequency of a carrier signal (a carrier frequency fc) determines a switching cycle (a total of one period of the upper on state and one period of the lower on state) in each phase. Control circuit 100 can adjust a ratio of the period of the upper on state to one switching cycle (duty ratio) by adjusting a duty command value in PWM control.

<Control of Discharging of Smoothing Capacitor C0>

When the vehicle on which power conversion system 1 is mounted stops operating or a fault occurs, electric power (charges) stored in smoothing capacitor C0 is desirably discharged early.

In discharging of electric power in smoothing capacitor C0, control circuit 100 alternately and periodically switches between "all-phase upper on control" in which power modules 21, 22, and 23 of all phases of inverter 20 are set to the upper on state and "all-phase lower on control" in which power modules 21, 22, and 23 of all phases are set to the lower on state while system main relay SMR is opened to disconnect battery 11 from inverter 20.

Figure 2:
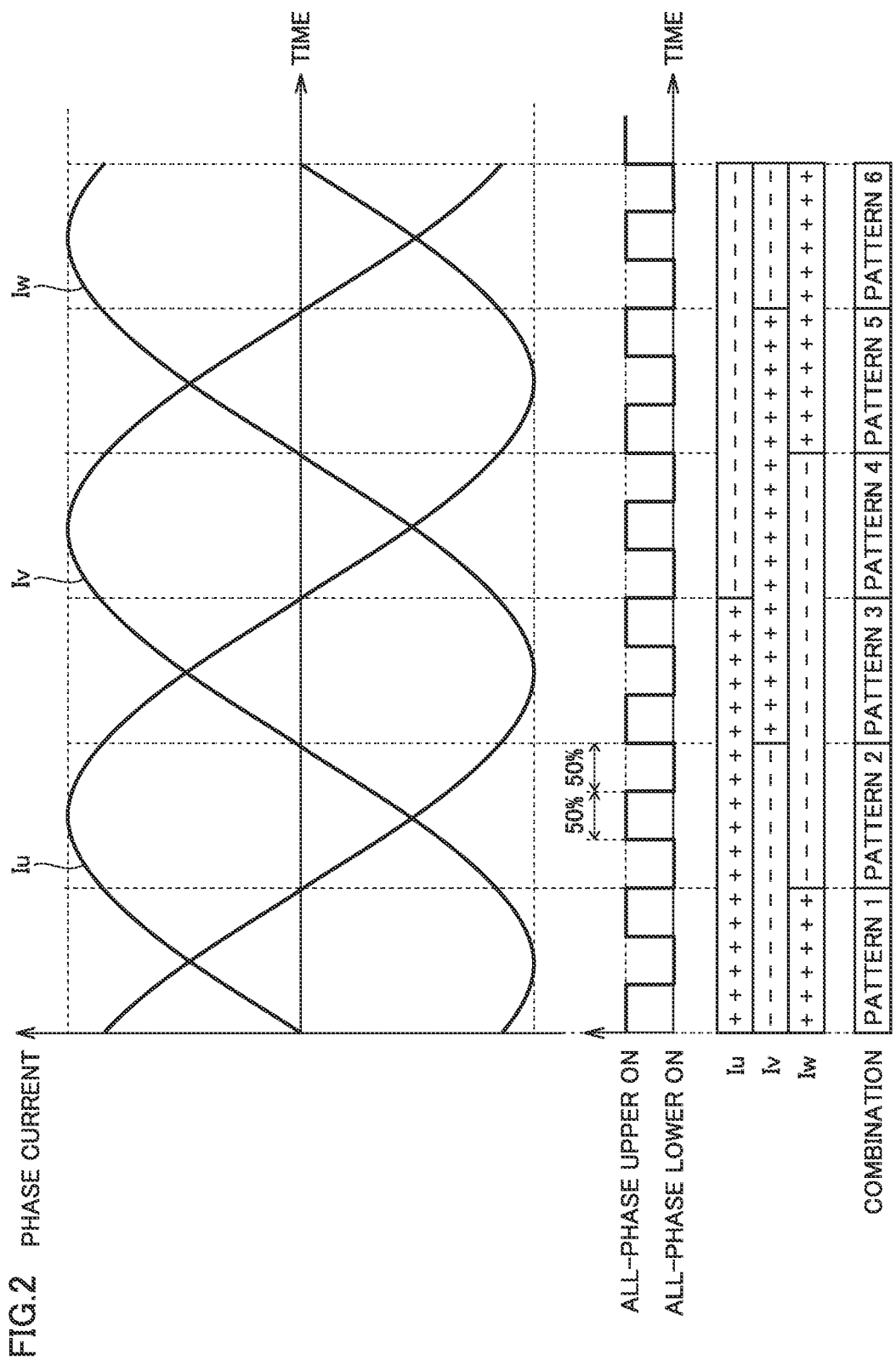
FIG. 2 is a diagram showing waveforms of phase currents Iu, Iv, and Iw and an operation to switch between all-phase upper on control and all-phase lower on control.

FIG. 2 is a diagram showing waveforms of phase currents Iu, Iv, and Iw and an operation to switch between all-phase upper on control and all-phase lower on control in discharging of electric power in smoothing capacitor C0.

As shown in FIG. 2, in discharging of electric power in smoothing capacitor C0, control circuit 100 alternately and periodically switches between all-phase upper on control and all-phase lower on control. At this time, a duty command value for each phase of inverter 20 is set to 50% such that a period of all-phase upper on control to one switching frequency in each phase is set to approximately 50%. By thus setting the duty command value of each phase to 50%, a voltage applied to motor 3 can be set to approximately 0 volt so that a current does not flow from inverter 20 to motor 3 (that is, motor 3 does not output positive torque for travel of the vehicle).

Furthermore, control circuit 100 carries out feed forward control for discharging of electric power in smoothing capacitor C0 during a period during which switching between all-phase upper on control and all-phase lower on control is made. Specifically, with a power module in which a current in the negative direction flows among three-phase power modules 21, 22, and 23 being defined as a negative current module and a power module in which a current in the positive direction flows being defined as a positive current module, during a period during which switching from one to the other of all-phase lower on control and all-phase upper on control is made, control circuit 100 performs, for a prescribed time period, "discharging processing" for setting the negative current module to the lower on state and setting the positive current module to the upper on state.

When control circuit 100 makes switching from all-phase lower on control to all-phase upper on control, control circuit 100 specifies whether each of power modules 21, 22, and 23 falls under the negative current module or the positive current module and then carries out control in the order of a mode A, a mode B, and a mode C.

Initially, in mode A, control circuit 100 performs first dead time processing for setting first dead time DT1 in which, while the negative current module is maintained in the lower on state, both of the upper switching element and the lower switching element in the positive current module are set to off.

After control circuit 100 performs the first dead time processing, control circuit 100 switches a control mode from mode A to mode B. In mode B, control circuit 100 performs the "discharging processing" described above for a prescribed time period. The time period during which discharging processing in mode B is performed (a discharging processing time period) is set in advance with a technique described with reference to FIG. 27 which will be described later.

After control circuit 100 performs the discharging processing for the prescribed time period, control circuit 100 switches the control mode from mode B to mode C. In mode C, control circuit 100 performs second dead time processing for setting second dead time DT2 in which, while the positive current module is maintained in the upper on state, both of the upper switching element and the lower switching element in the negative current module are set to off.

Then, after control circuit 100 performs the second dead time processing, control circuit 100 performs all-phase upper on control with the positive current module being maintained in the upper on state and the negative current module being switched to the upper on state.

In switching from all-phase upper on control to all-phase lower on control, control circuit 100 carries out control in the order reverse to the order in switching from all-phase lower on control to all-phase upper on control, that is, in the order of mode C, mode B, and mode A.

Specifically, initially, in mode C, control circuit 100 performs the second dead time processing for setting second dead time DT2 in which, while the positive current module is maintained in the upper on state, both of the upper switching element and the lower switching element in the negative current module are set to off.

After control circuit 100 performs the second dead time processing, control circuit 100 switches the control mode from mode C to mode B. In mode B, control circuit 100 performs the "discharging processing" described above for the prescribed time period.

After control circuit 100 performs the discharging processing for the prescribed time period, control circuit 100 switches the control mode from mode B to mode A. In mode A, control circuit 100 performs the first dead time processing for setting first dead time DT1 in which, while the negative current module is maintained in the lower on state, both of the upper switching element and the lower switching element in the positive current module are set to off.

Then, after control circuit 100 performs the first dead time processing, control circuit 100 carries out all-phase lower on control with the negative current module being maintained in the lower on state and the positive current module being switched to the lower on state.

Patterns 1 to 6 below are assumed as combinations (Iu, Iv, Iw) of positive and negative phase currents Iu, Iv, and Iw as shown in FIG. 2.

Pattern 1: (Iu, Iv, Iw)=(+, −, +)
Pattern 2: (Iu, Iv, Iw)=(+, −, −)
Pattern 3: (Iu, Iv, Iw)=(+, +, −)
Pattern 4: (Iu, Iv, Iw)=(−, +, −)
Pattern 5: (Iu, Iv, Iw)=(−, +, +)
Pattern 6: (Iu, Iv, Iw)=(−, −, +)

The switching operation by switching elements Q1 to Q6 in control of discharging of smoothing capacitor C0 will specifically be described for each of patterns 1 to 6 of combinations of positive and negative phase currents Iu, Iv, and Iw.

Figure 3:
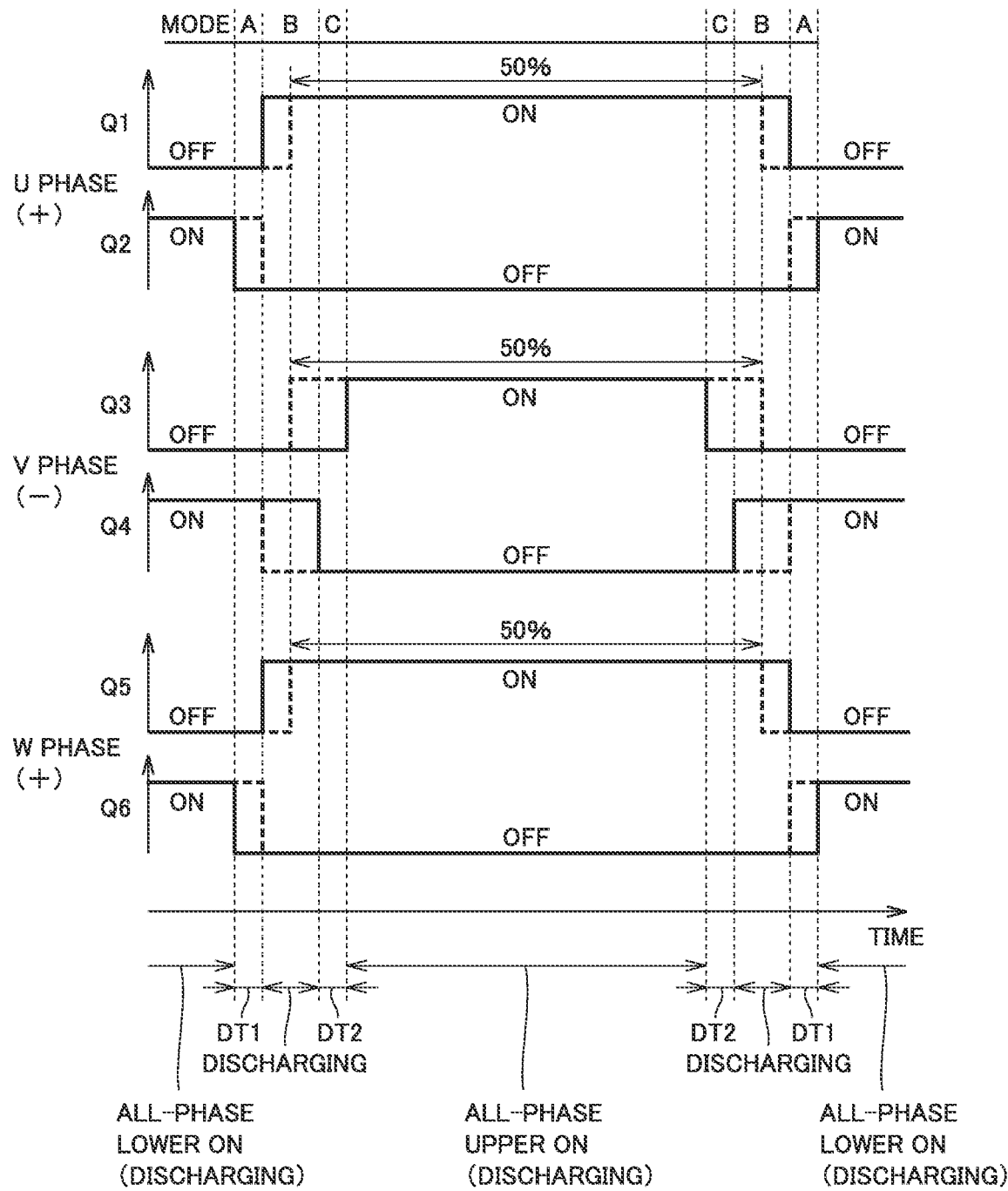
FIG. 3 is a diagram showing a drive signal for a switching element in a pattern 1.

FIG. 3 is a diagram showing a drive signal for switching elements Q1 to Q6 in pattern 1: (Iu, Iv, Iw)=(+, −, +). In pattern 1, U-phase power module 21 and W-phase power module 23 fall under the "positive current modules" and V-phase power module 22 falls under the "negative current module."

In switching from all-phase lower on control to all-phase upper on control, control is carried out in the order of mode A, mode B, and mode C described above.

Initially, in mode A, lower switching elements Q2 and Q6 of U-phase power module 21 and W-phase power module 23 (positive current modules) are turned off. First dead time DT1 of the positive current module is thus set while the negative current module is maintained in the lower on state. First dead time DT1 lasts for a predetermined time period.

Figure 4:
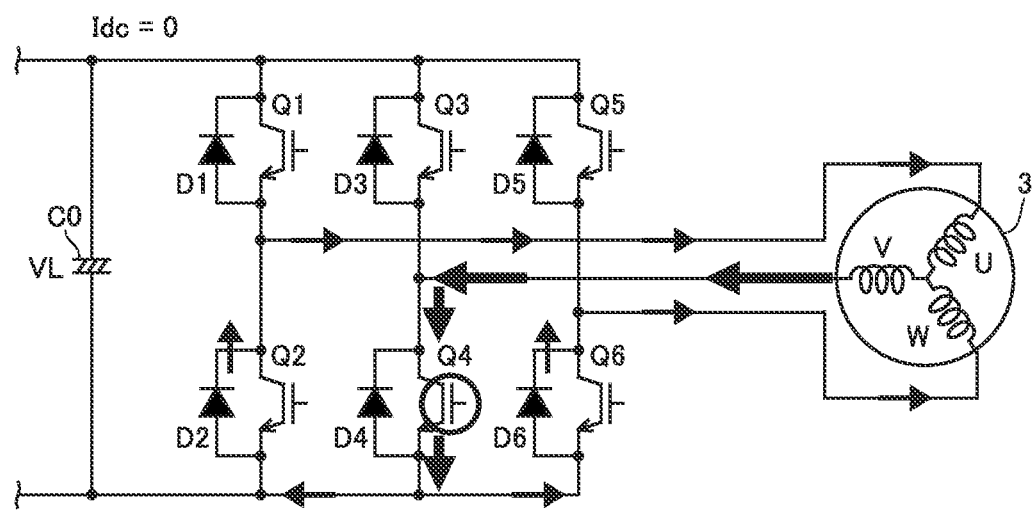
FIG. 4 is a diagram schematically showing a flow of a current in a mode A in pattern 1.

FIG. 4 is a diagram schematically showing a flow of a current in mode A (first dead time DT1) in pattern 1. In mode A in pattern 1, a path for circulation of the current between motor 3 and inverter 20 is formed. Specifically, the current from motor 3 passes through lower switching element Q4 and lower diodes D2 and D6 and returns to motor 3. Therefore, a discharging current Idc from smoothing capacitor C0 is 0. In other words, in mode A, even while motor 3 is rotating (in a regenerative state), smoothing capacitor C0 is not charged or discharged.

Referring back to FIG. 3, after first dead time DT1, switching from mode A to mode B is made. In mode B, upper switching elements Q1 and Q5 of U-phase power module 21 and W-phase power module 23 (positive current modules) are turned on. Thus, the negative current module is set to the lower on state and the positive current modules are set to the upper on state. This mode B corresponds to the "discharging processing" described above. The discharging processing is performed for a prescribed time period.

Figure 5:
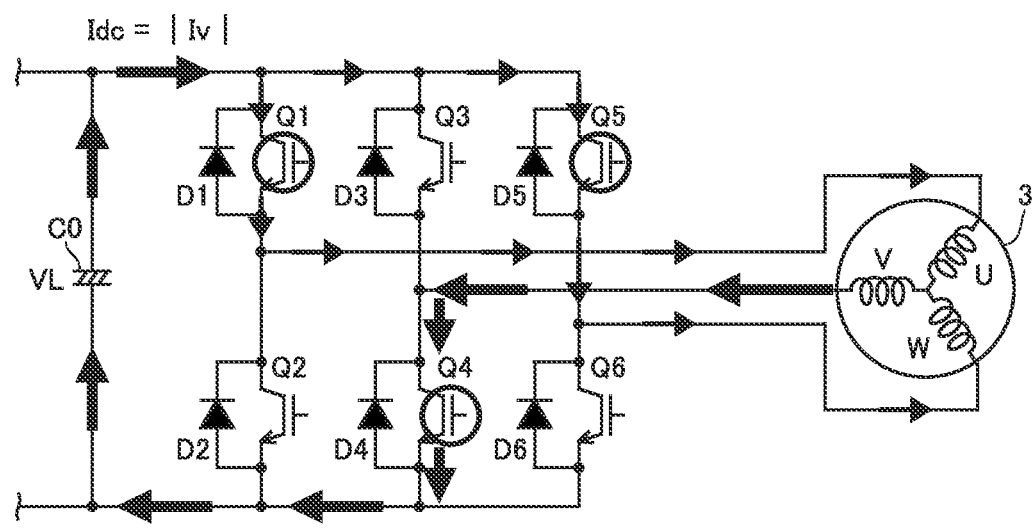
FIG. 5 is a diagram schematically showing a flow of a current in a mode B in pattern 1.

FIG. 5 is a diagram schematically showing a flow of a current in mode B (discharging processing) in pattern 1. In mode B in pattern 1, a discharging path for smoothing capacitor C0 is formed. Specifically, a current path from smoothing capacitor C0 through upper switching elements Q1 and Q5, motor 3, and lower switching element Q4 back to smoothing capacitor C0 is formed. In this case, discharging current Idc from smoothing capacitor C0 attains to |Iv|. In other words, in mode B, even while motor 3 is rotating (in the regenerative state), smoothing capacitor C0 is discharged.

Referring back to FIG. 3, after the discharging processing is performed for the prescribed time period, switching from mode B to mode C is made. In mode C, lower switching element Q4 of V-phase power module 22 which falls under the negative current module is turned off. Thus, while the positive current modules are maintained in the upper on state, second dead time DT2 of the negative current module is set. Second dead time DT2 lasts for a predetermined time period.

Figure 6:
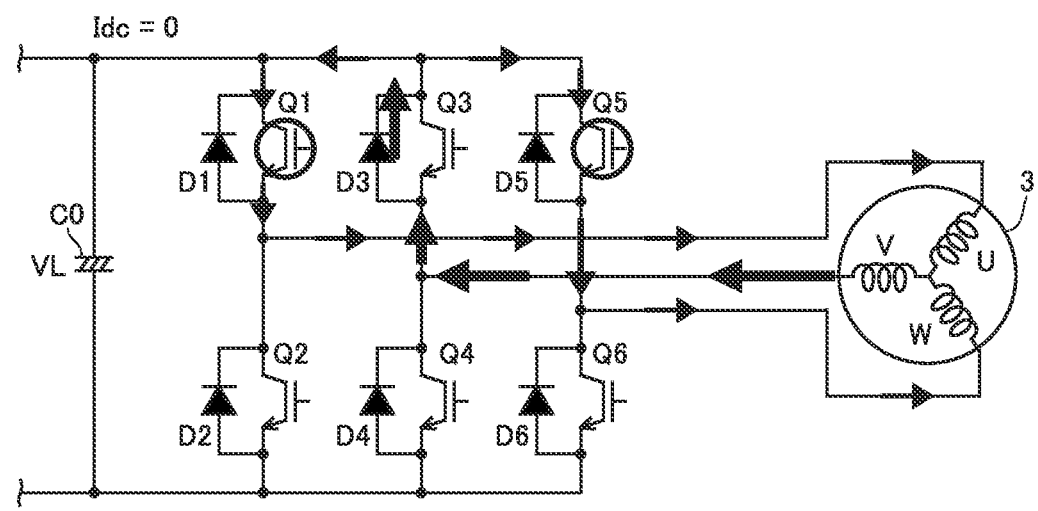
FIG. 6 is a diagram schematically showing a flow of a current in a mode C in pattern 1.

FIG. 6 is a diagram schematically showing a flow of a current in mode C (second dead time DT2) in pattern 1. In mode C in pattern 1, a path for circulation of the current between motor 3 and inverter 20 is formed. Specifically, the current from motor 3 passes through upper diode D3 and upper switching elements Q1 and Q5 of inverter 20 and returns to motor 3. Therefore, discharging current Idc from smoothing capacitor C0 is 0. In other words, in mode C, even while motor 3 is rotating (in the regenerative state), regenerative power from motor 3 is not charged to smoothing capacitor C0.

Referring back to FIG. 3, after second dead time DT2 is performed, while U-phase power module 21 and W-phase power module 23 (positive current modules) are maintained in the upper on state, upper switching element Q3 of V-phase power module 22 (negative current module) is switched to the upper on state. Switching to all-phase upper on control is thus completed.

In switching from all-phase upper on control to all-phase lower on control, control is carried out in the order of mode C, mode B, and mode A described above. The flow of the current in modes A, B, and C in pattern 1 is as shown in FIGS. 4 to 6 described above. Therefore, also in switching from all-phase upper on control to all-phase lower on control, smoothing capacitor C0 is not charged and discharged in modes A and C but smoothing capacitor C0 is discharged in mode B.

The drive signal shown with a dashed line in FIG. 3 is a drive signal in an example where modes A and C alone are carried out without mode B (discharging processing) being carried out, as an example comparative to the present disclosure. In this case, smoothing capacitor C0 is not discharged in mode B (discharging processing).

In contrast, in the present disclosure, mode B (discharging processing) is set between mode A (first dead time DT1) and mode C (second dead time DT2). Therefore, in the present disclosure, discharging of smoothing capacitor C0 is more expedited and smoothing capacitor C0 can be discharged earlier than in the comparative example.

Figure 7:
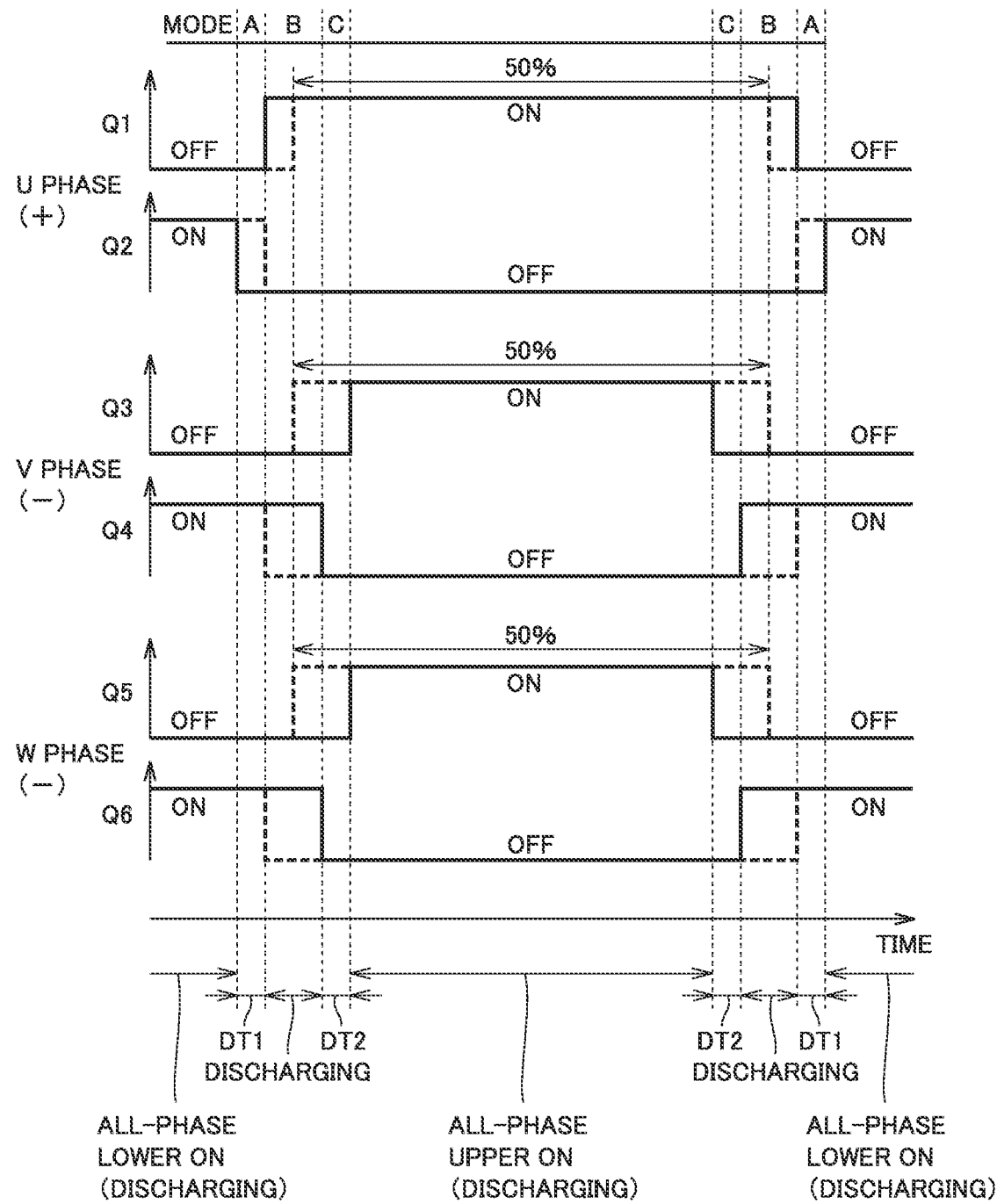
FIG. 7 is a diagram showing a drive signal for the switching element in a pattern 2.

FIG. 7 is a diagram showing a drive signal for switching elements Q1 to Q6 in pattern 2: (Iu, Iv, Iw)=(+, −, −). In pattern 2, U-phase power module 21 falls under the "positive current module" and V-phase power module 22 and W-phase power module 23 fall under the "negative current modules." As in pattern 1, also in pattern 2, in switching from all-phase lower on control to all-phase upper on control, first dead time DT1 for the positive current module is set in mode A, the discharging processing is performed for a prescribed time period in subsequent mode B, and second dead time DT2 for the negative current modules is set in subsequent mode C. In switching from all-phase upper on control to all-phase lower on control, second dead time DT2 for the negative current modules is set in mode C, the discharging processing is performed for a prescribed time period in subsequent mode B, and first dead time DT1 for the positive current module is set in subsequent mode A.

Figure 8:
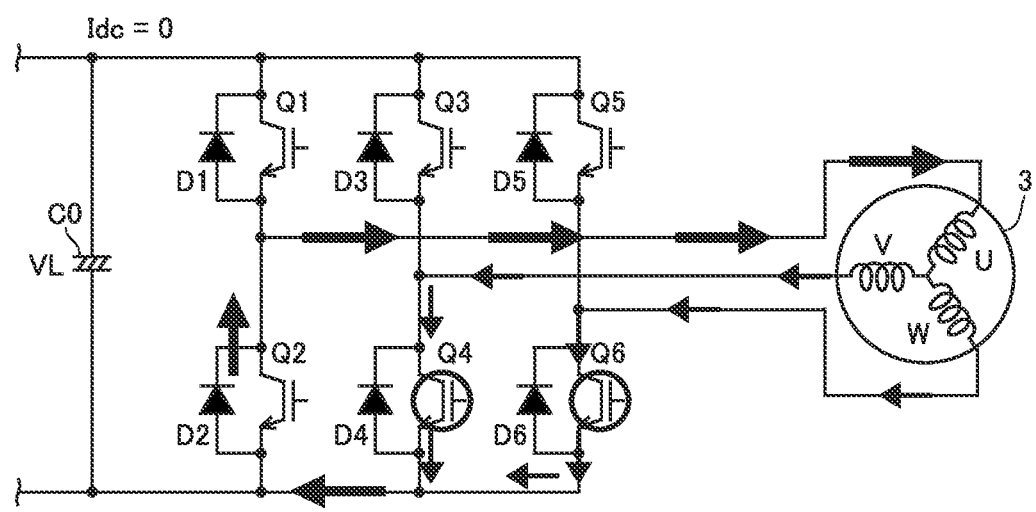
FIG. 8 is a diagram schematically showing a flow of a current in mode A in pattern 2.
Figure 9:
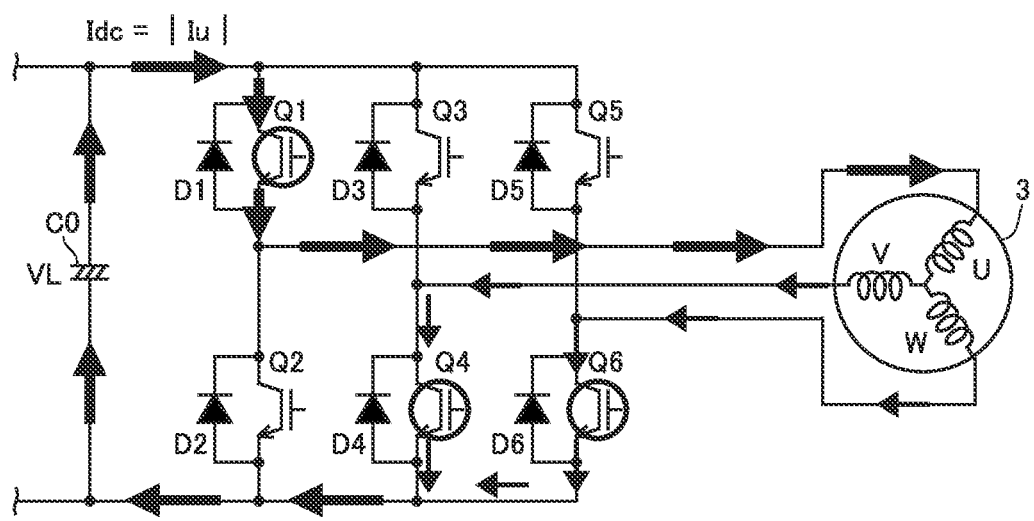
FIG. 9 is a diagram schematically showing a flow of a current in mode B in pattern 2.
Figure 10:
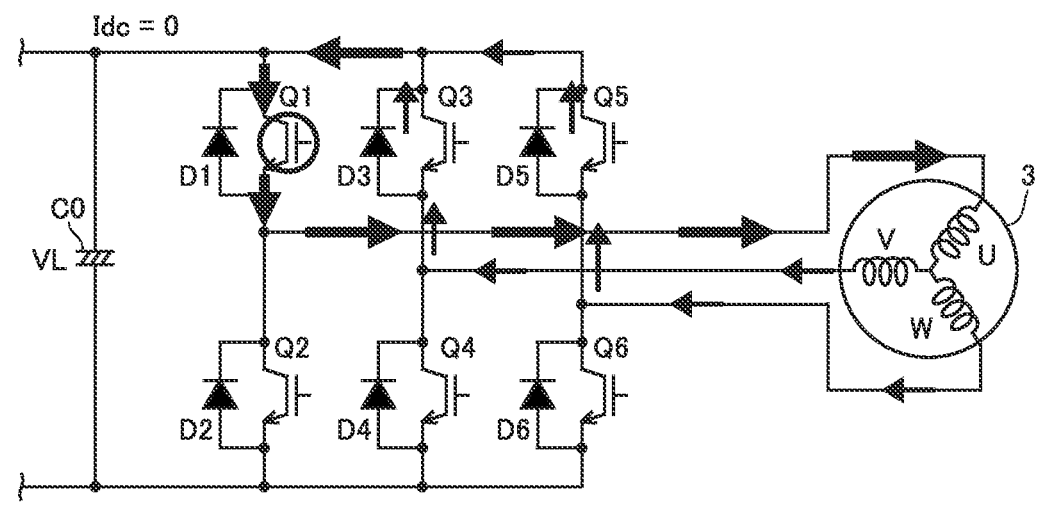
FIG. 10 is a diagram schematically showing a flow of a current in mode C in pattern 2.

FIG. 8 is a diagram schematically showing a flow of a current in mode A (first dead time DT1) in pattern 2. FIG. 9 is a diagram schematically showing a flow of a current in mode B (discharging processing) in pattern 2. FIG. 10 is a diagram schematically showing a flow of a current in mode C (second dead time DT2) in pattern 2. As shown in FIGS. 8 to 10, as in pattern 1, also in pattern 2, smoothing capacitor C0 is not charged and discharged in modes A and C but smoothing capacitor C0 is discharged in mode B.

Figure 11:
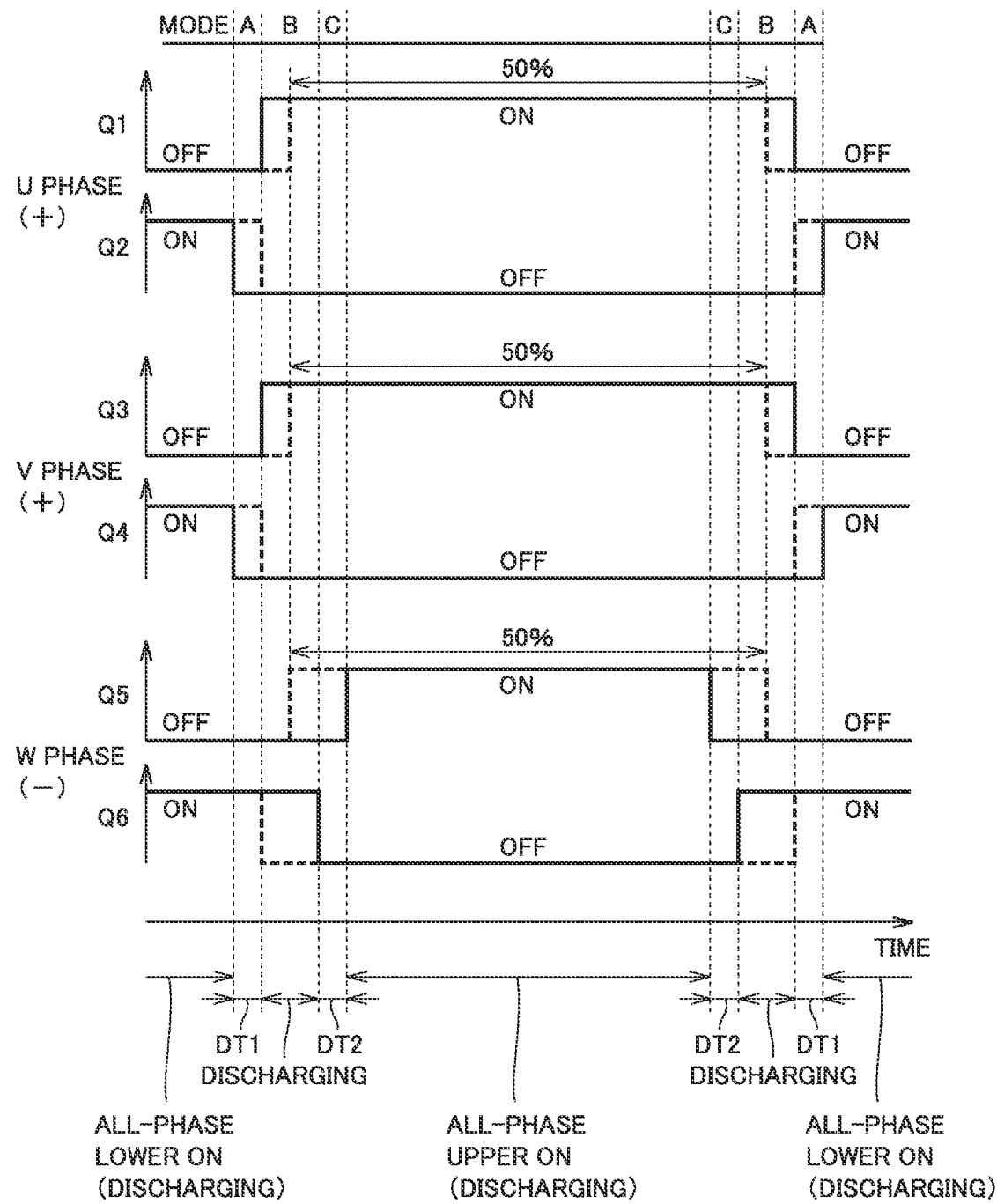
FIG. 11 is a diagram showing a drive signal for the switching element in a pattern 3.

FIG. 11 is a diagram showing a drive signal for switching elements Q1 to Q6 in pattern 3: (Iu, Iv, Iw)=(+, +, −). In pattern 3, U-phase power module 21 and V-phase power module 22 fall under the "positive current modules" and W-phase power module 23 falls under the "negative current module." As shown in FIG. 11, as in pattern 1, also in pattern 3, in switching from all-phase lower on control to all-phase upper on control, control is carried out in the order of modes A, B, and C, and in switching from all-phase upper on control to all-phase lower on control, control is carried out in the order of modes C, B, and A.

Figure 12:
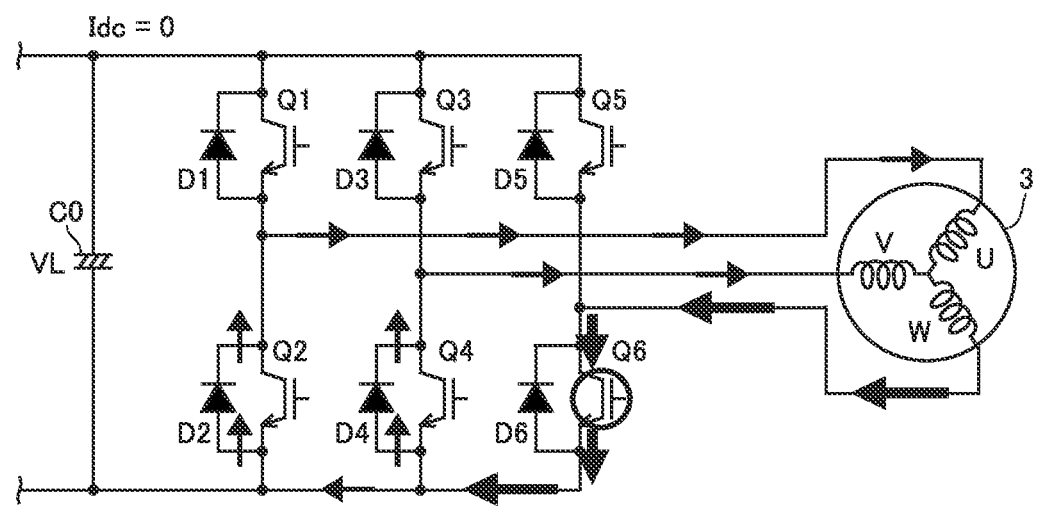
FIG. 12 is a diagram schematically showing a flow of a current in mode A in pattern 3.
Figure 13:
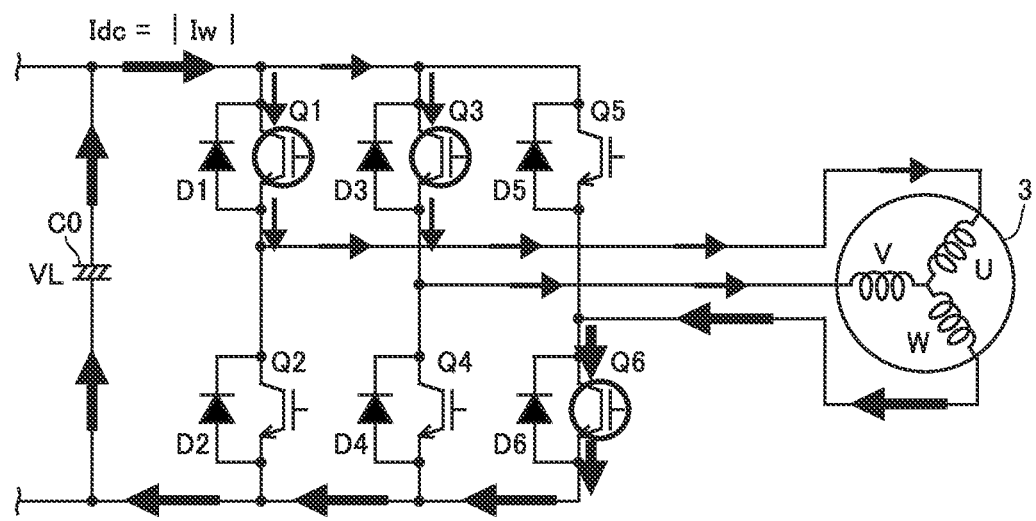
FIG. 13 is a diagram schematically showing a flow of a current in mode B in pattern 3.
Figure 14:
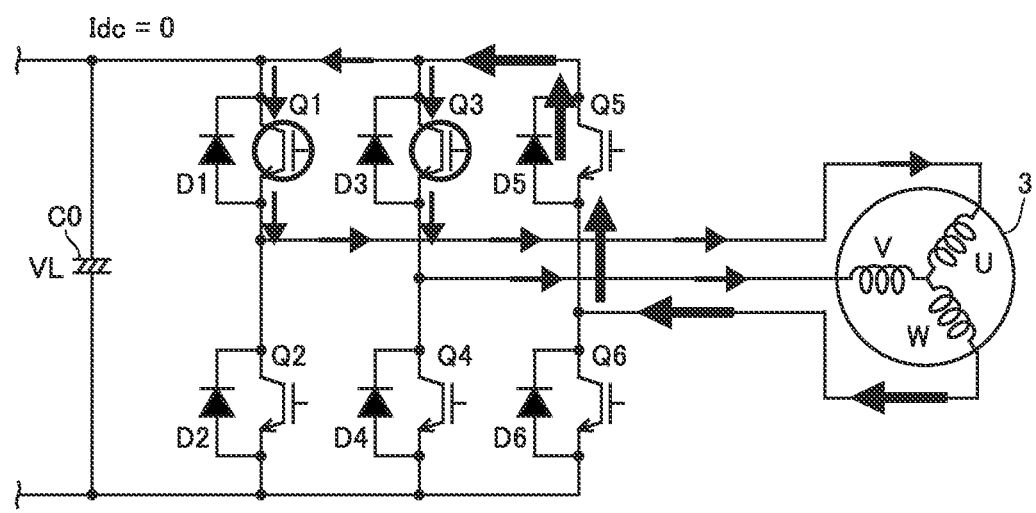
FIG. 14 is a diagram schematically showing a flow of a current in mode C in pattern 3.

FIG. 12 is a diagram schematically showing a flow of a current in mode A (first dead time DT1) in pattern 3. FIG. 13 is a diagram schematically showing a flow of a current in mode B (discharging processing) in pattern 3. FIG. 14 is a diagram schematically showing a flow of a current in mode C (second dead time DT2) in pattern 3. As shown in FIGS. 12 to 14, as in pattern 1, also in pattern 3, smoothing capacitor C0 is not charged and discharged in modes A and C but smoothing capacitor C0 is discharged in mode B.

Figure 15:
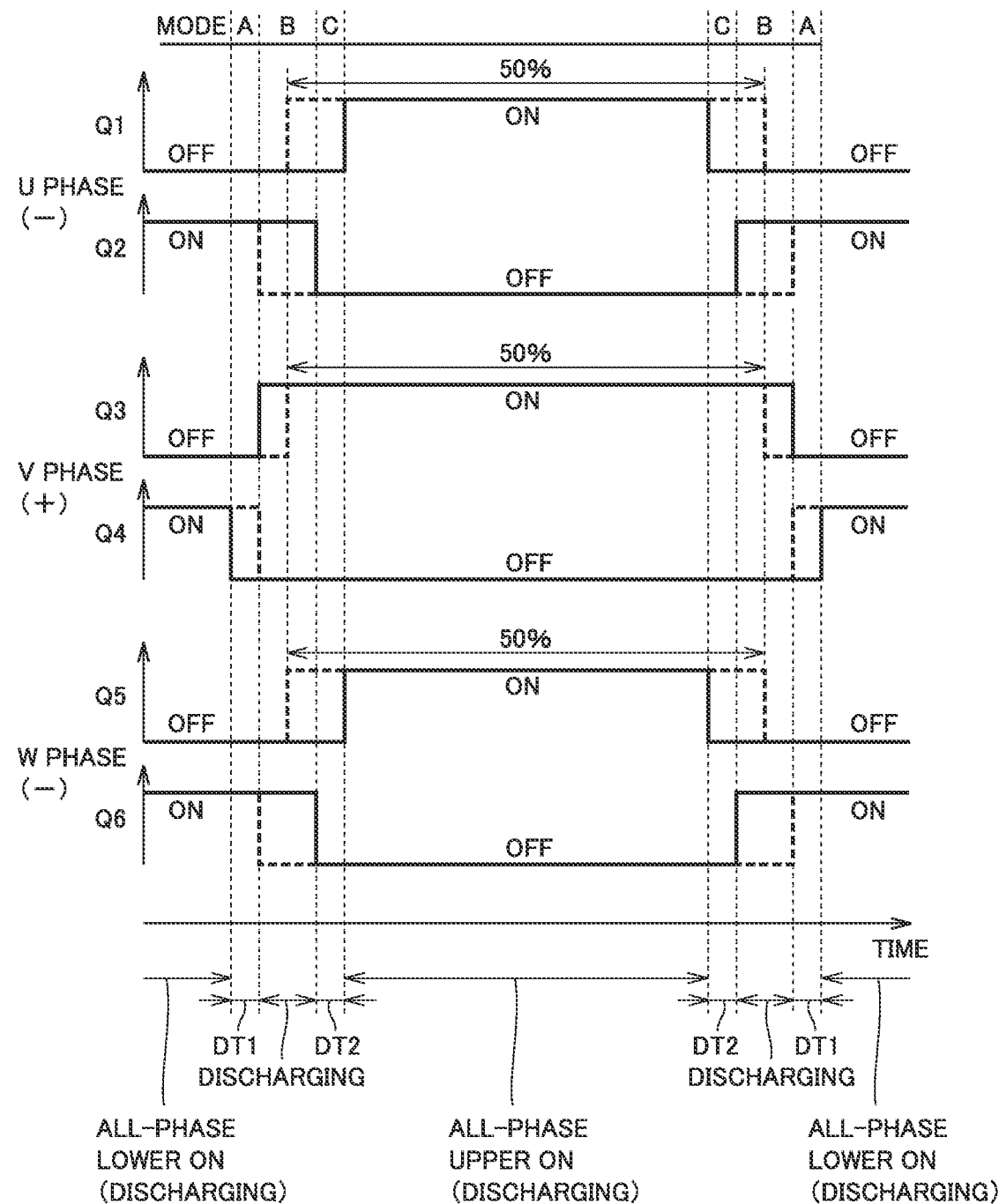
FIG. 15 is a diagram showing a drive signal for the switching element in a pattern 4.

FIG. 15 is a diagram showing a drive signal for switching elements Q1 to Q6 in pattern 4: (Iu, Iv, Iw)=(−, +, −). In pattern 4, V-phase power module 22 falls under the "positive current module" and U-phase power module 21 and W-phase power module 23 fall under the "negative current modules."

As shown in FIG. 15, as in pattern 1, also in pattern 4, in switching from all-phase lower on control to all-phase upper on control, control is carried out in the order of modes A, B, and C, and in switching from all-phase upper on control to all-phase lower on control, control is carried out in the order of modes C, B, and A.

Figure 16:
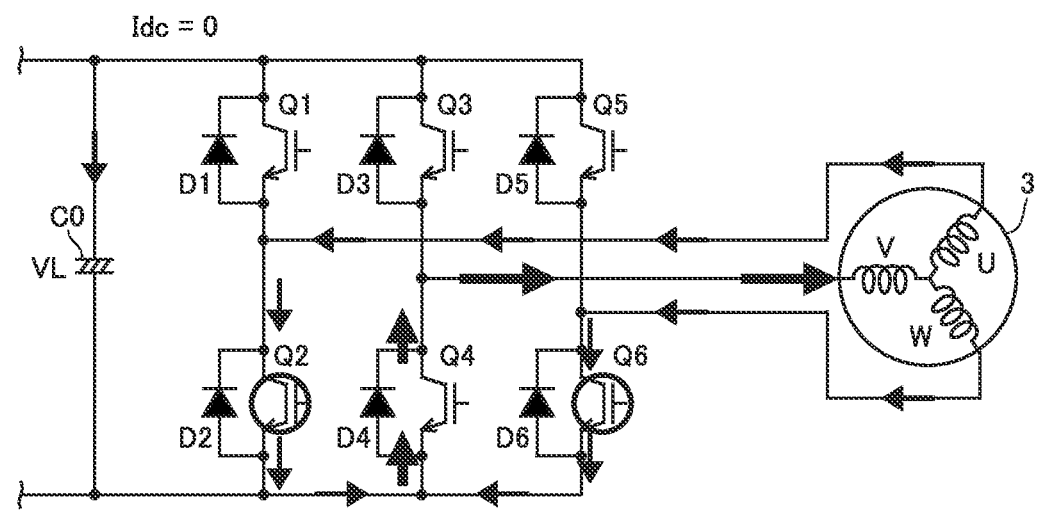
FIG. 16 is a diagram schematically showing a flow of a current in mode A in pattern 4.
Figure 17:
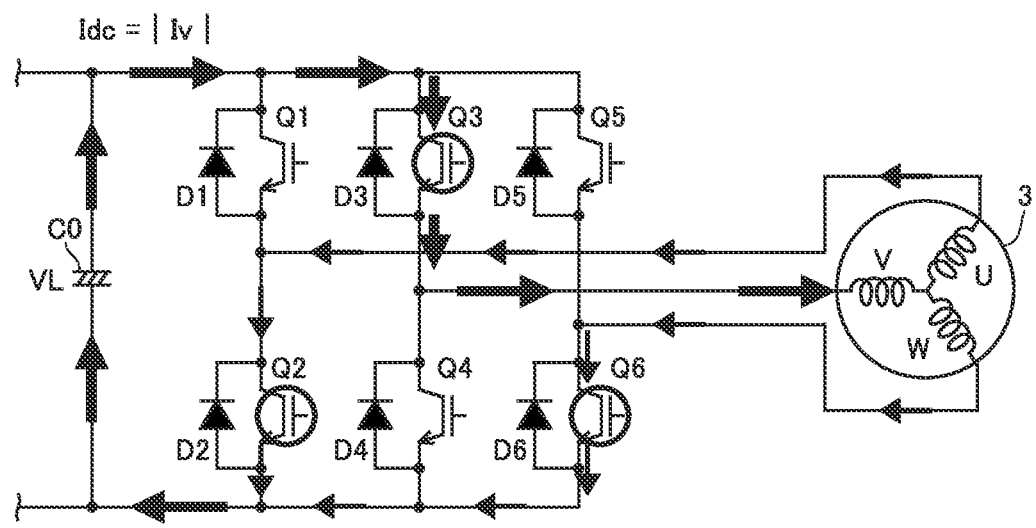
FIG. 17 is a diagram schematically showing a flow of a current in mode B in pattern 4.
Figure 18:
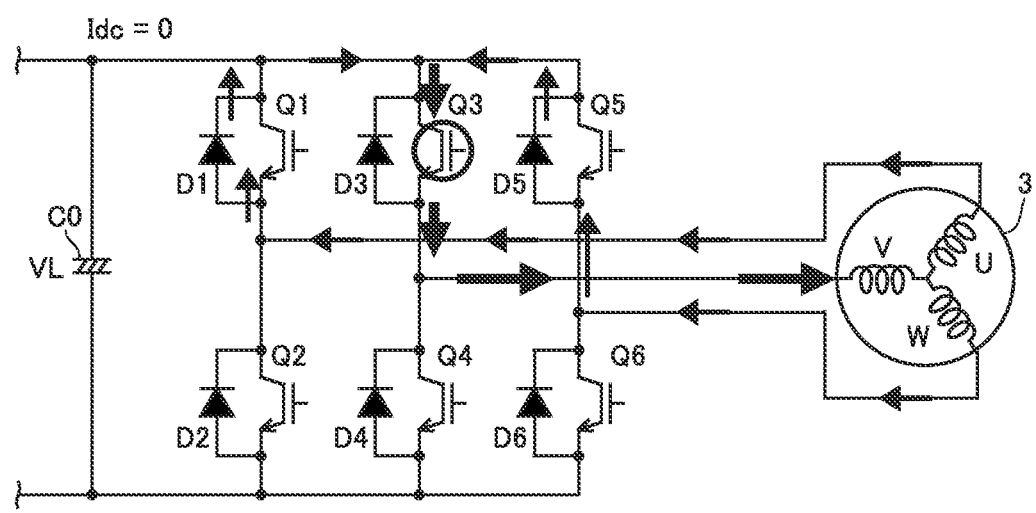
FIG. 18 is a diagram schematically showing a flow of a current in mode C in pattern 4.

FIG. 16 is a diagram schematically showing a flow of a current in mode A (first dead time DT1) in pattern 4. FIG. 17 is a diagram schematically showing a flow of a current in mode B (discharging processing) in pattern 4. FIG. 18 is a diagram schematically showing a flow of a current in mode C (second dead time DT2) in pattern 4. As shown in FIGS. 16 to 18, as in pattern 1, also in pattern 4, smoothing capacitor C0 is not charged and discharged in modes A and C but smoothing capacitor C0 is discharged in mode B.

Figure 19:
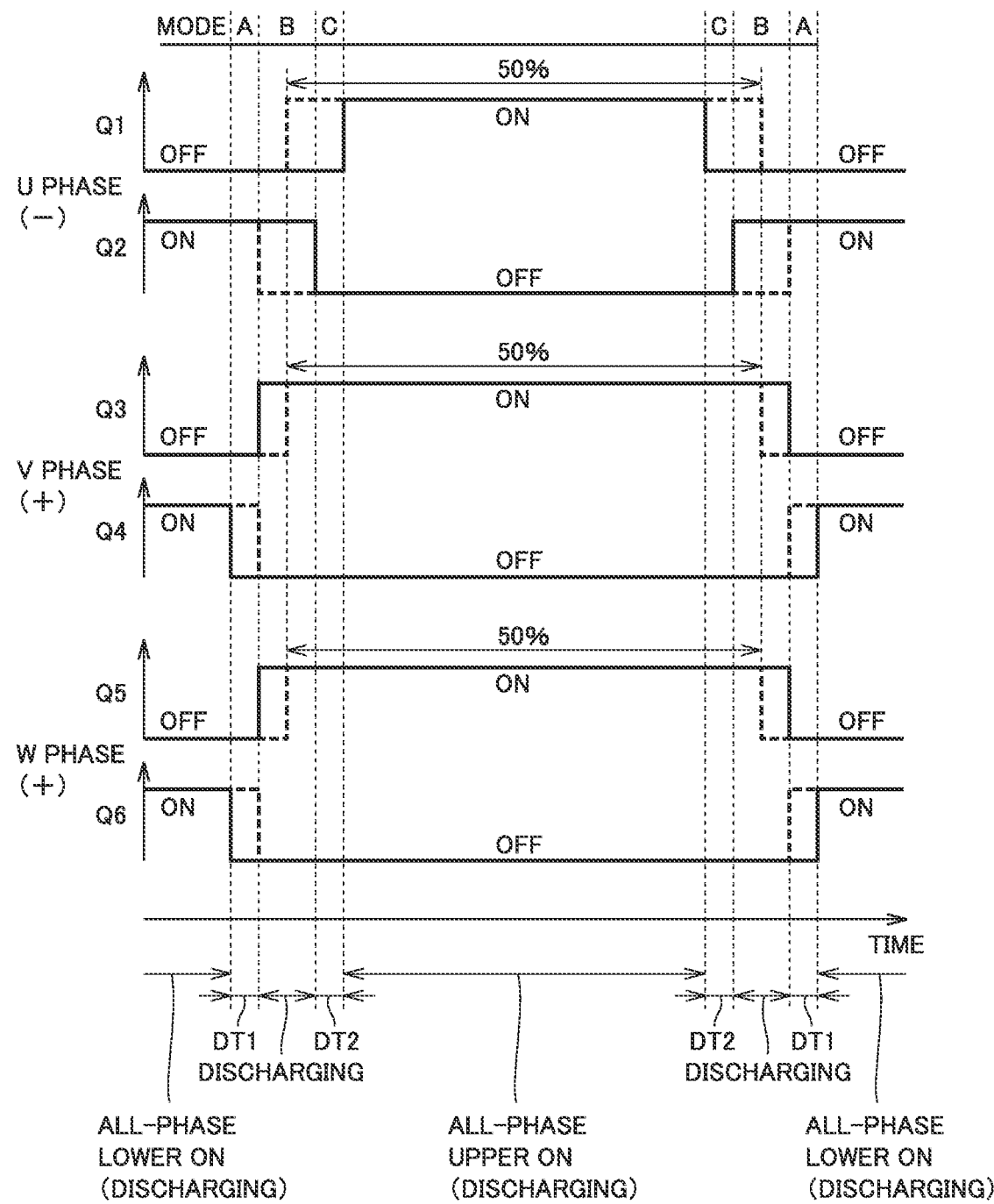
FIG. 19 is a diagram showing a drive signal for the switching element in a pattern 5.

FIG. 19 is a diagram showing a drive signal for switching elements Q1 to Q6 in pattern 5: (Iu, Iv, Iw)=(−, +, +). In pattern 5, V-phase power module 22 and W-phase power module 23 fall under the "positive current modules" and U-phase power module 21 falls under the "negative current module." As shown in FIG. 19, as in pattern 1, also in pattern 5, in switching from all-phase lower on control to all-phase upper on control, control is carried out in the order of modes A, B, and C, and in switching from all-phase upper on control to all-phase lower on control, control is carried out in the order of modes C, B, and A.

Figure 20:
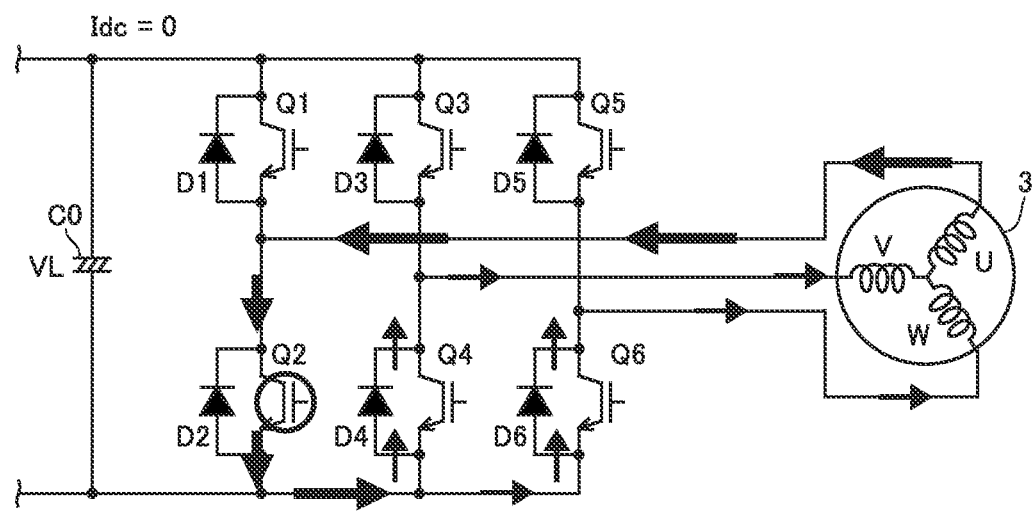
FIG. 20 is a diagram schematically showing a flow of a current in mode A in pattern 5.
Figure 21:
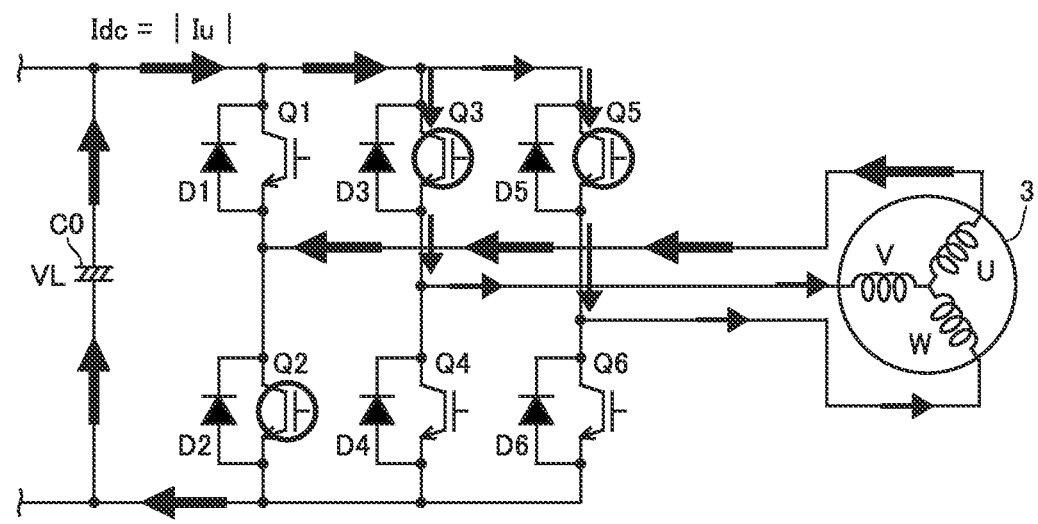
FIG. 21 is a diagram schematically showing a flow of a current in mode B in pattern 5.
Figure 22:
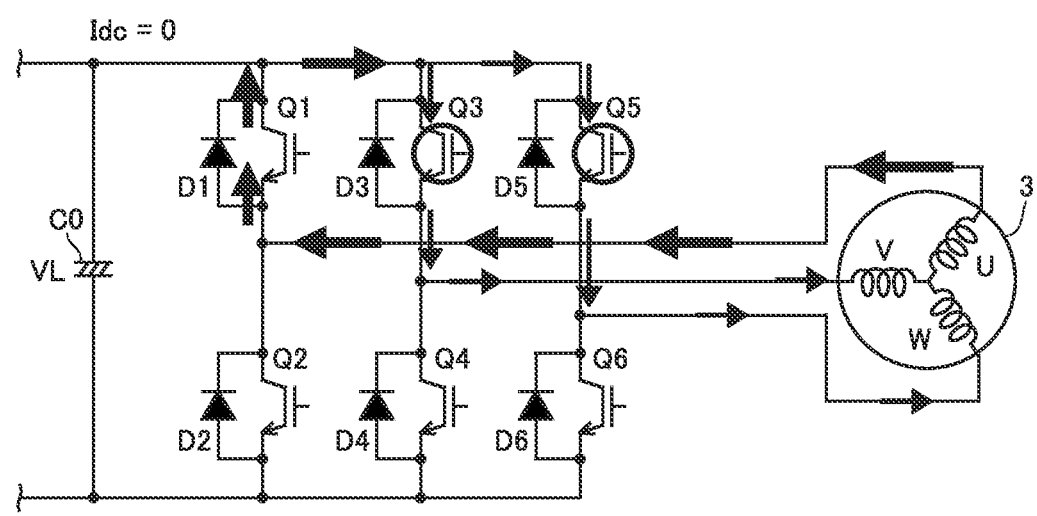
FIG. 22 is a diagram schematically showing a flow of a current in mode C in pattern 5.

FIG. 20 is a diagram schematically showing a flow of a current in mode A (first dead time DT1) in pattern 5. FIG. 21 is a diagram schematically showing a flow of a current in mode B (discharging processing) in pattern 5. FIG. 22 is a diagram schematically showing a flow of a current in mode C (second dead time DT2) in pattern 5. As shown in FIGS. 20 to 22, as in pattern 1, also in pattern 5, smoothing capacitor C0 is not charged and discharged in modes A and C but smoothing capacitor C0 is discharged in mode B.

Figure 23:
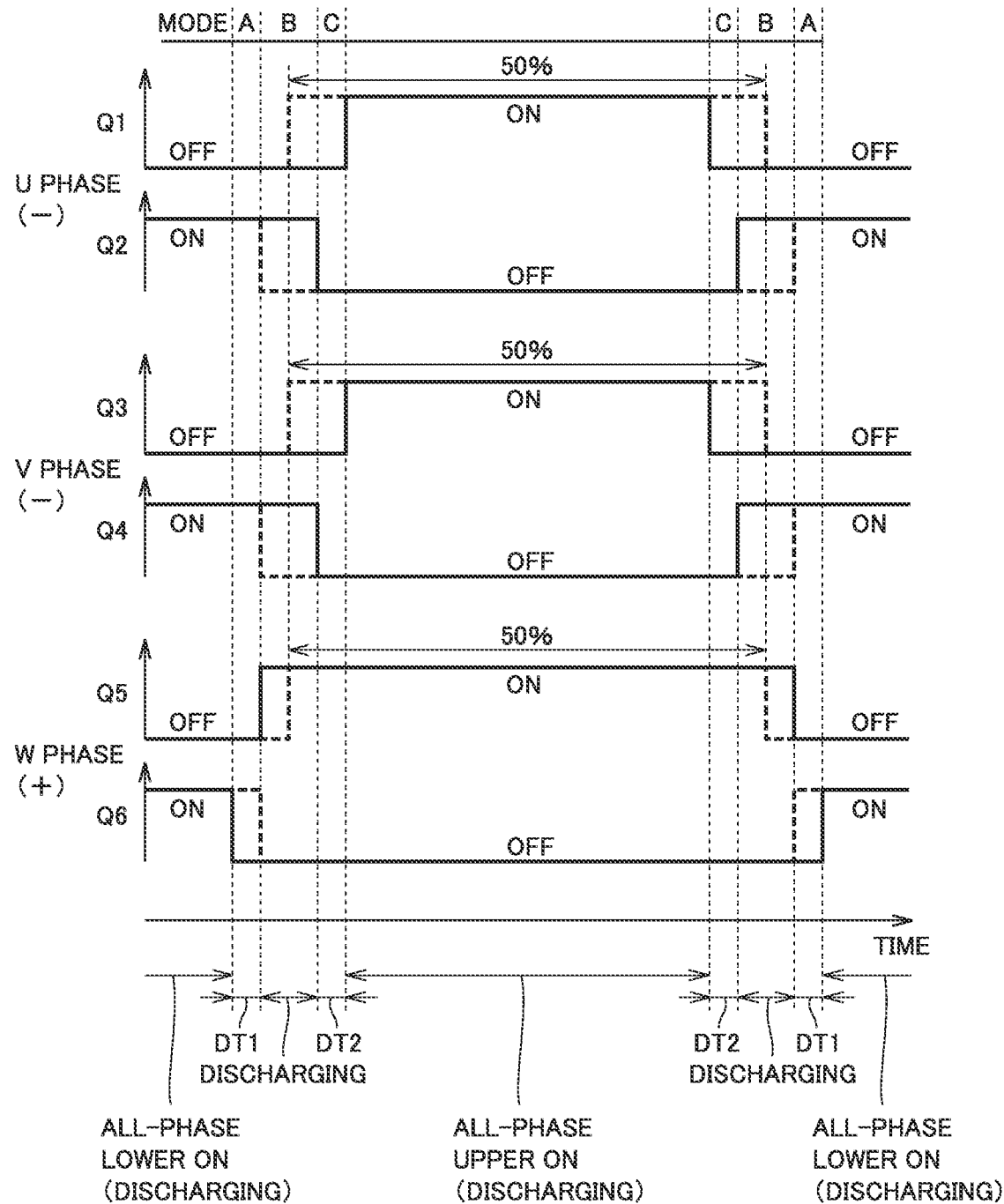
FIG. 23 is a diagram showing a drive signal for the switching element in a pattern 6.

FIG. 23 is a diagram showing a drive signal for switching elements Q1 to Q6 in pattern 6: (Iu, Iv, Iw)=(−, −, +). In pattern 6, W-phase power module 23 falls under the "positive current module" and U-phase power module 21 and V-phase power module 22 fall under the "negative current modules." As shown in FIG. 23, as in pattern 1, also in pattern 6, in switching from all-phase lower on control to all-phase upper on control, control is carried out in the order of modes A, B, and C, and in switching from all-phase upper on control to all-phase lower on control, control is carried out in the order of modes C, B, and A.

Figure 24:
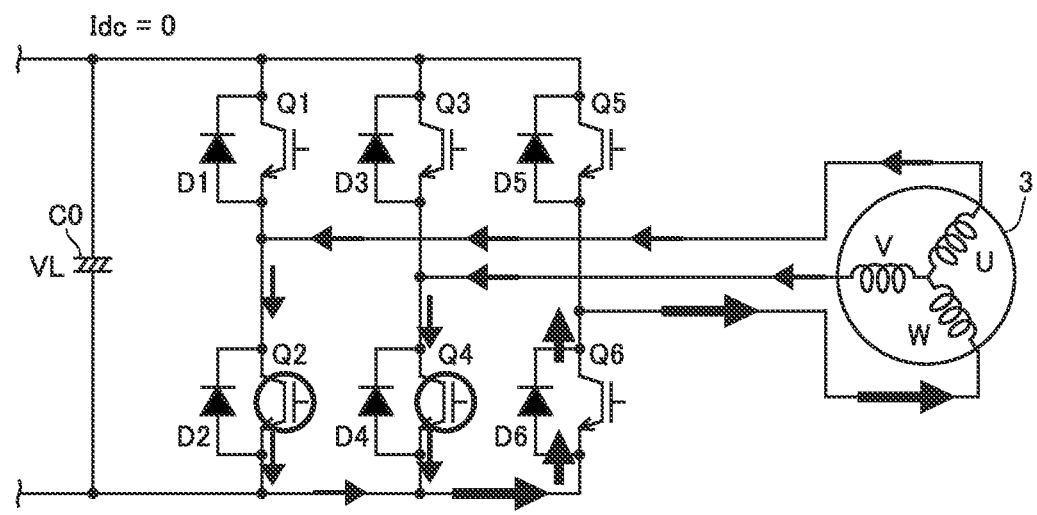
FIG. 24 is a diagram schematically showing a flow of a current in mode A in pattern 6.
Figure 25:
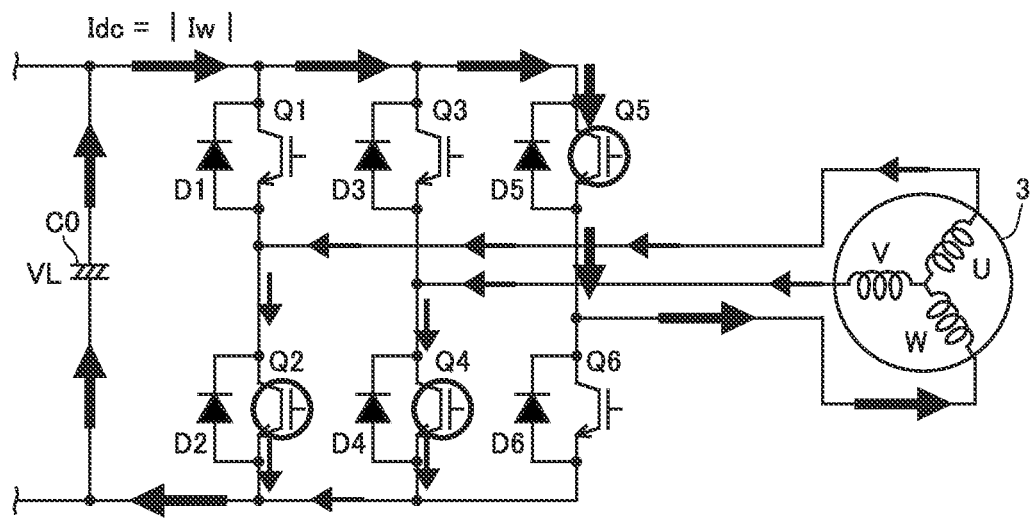
FIG. 25 is a diagram schematically showing a flow of a current in mode B in pattern 6.
Figure 26:
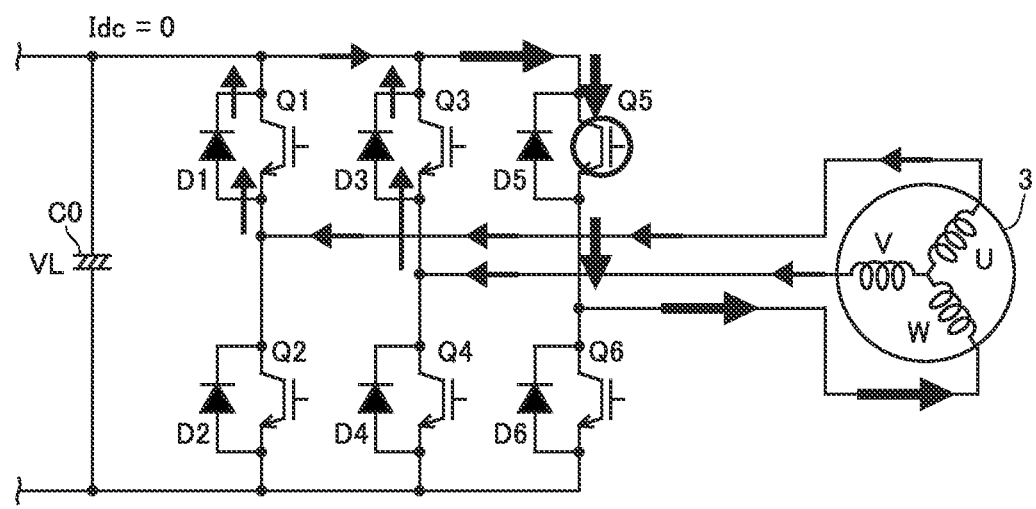
FIG. 26 is a diagram schematically showing a flow of a current in mode C in pattern 6.

FIG. 24 is a diagram schematically showing a flow of a current in mode A (first dead time DT1) in pattern 6. FIG. 25 is a diagram schematically showing a flow of a current in mode B (discharging processing) in pattern 6. FIG. 26 is a diagram schematically showing a flow of a current in mode C (second dead time DT2) in pattern 6. As shown in FIGS. 24 to 26, as in pattern 1, also in pattern 6, smoothing capacitor C0 is not charged and discharged in modes A and C but smoothing capacitor C0 is discharged in mode B.

<Setting of Discharging Processing Time Period>

In mode B described above, control circuit 100 performs the "discharging processing" described above for a prescribed time period. The time period during which the discharging processing in mode B is performed (discharging processing time period) is set in advance such that output torque from motor 3 is negative and electric power in smoothing capacitor C0 is discharged.

Figure 27:
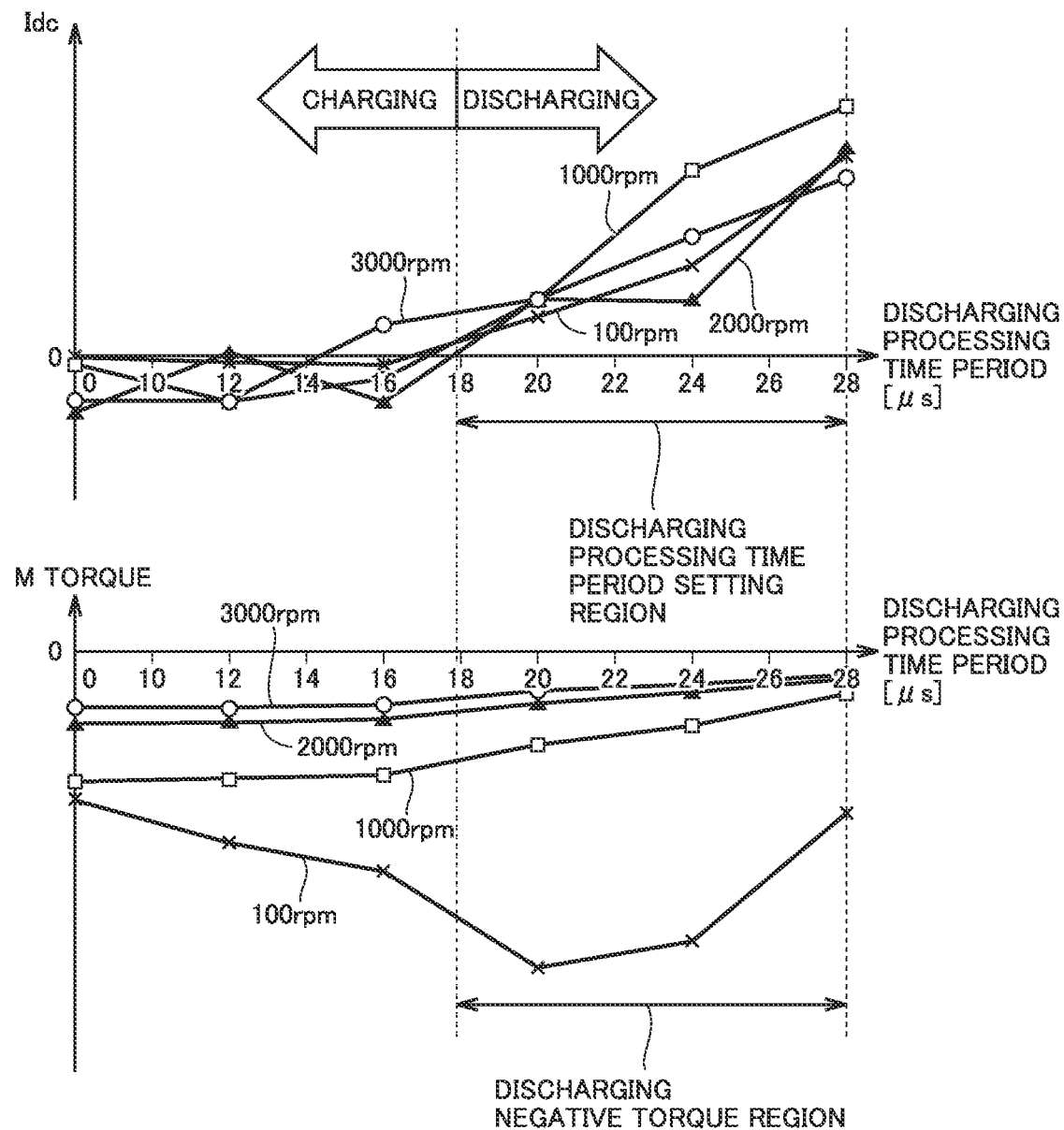
FIG. 27 is a diagram showing exemplary correspondence between a discharging processing time period and M torque.

FIG. 27 is a diagram showing exemplary correspondence between a discharging processing time period in mode B, and discharging current Idc from smoothing capacitor C0 and output torque from motor 3 (which is also referred to as "M torque" below) when a rotation speed of motor 3 is set to 100 rpm, 1000 rpm, 2000 rpm, and 3000 rpm.

FIG. 27 shows in an upper tier, correspondence between the discharging processing time period (abscissa) and discharging current Idc (ordinate) for each rotation speed of motor 3. FIG. 27 shows in a lower tier, correspondence between the discharging processing time period (abscissa) and M torque (ordinate) for each rotation speed of motor 3. The correspondence shown in FIG. 27 can be obtained, for example, by simulation or experiments.

Discharging current Idc having a positive value in FIG. 27 means discharging of smoothing capacitor C0 and discharging current Idc having a negative value means charging of smoothing capacitor C0. M torque having a positive value in FIG. 27 means a power running state of motor 3 and M torque having a negative value means a regenerative state of motor 3.

In an example where the correspondence as shown in FIG. 27 is obtained, when the discharging processing time period is set to 18 to 28 [μs] while motor 3 is rotating at a speed lower than 2000 rpm, discharging current Idc substantially attains to a positive value and smoothing capacitor C0 is discharged, and M torque attains to a negative value and motor 3 generates negative torque.

In view of this, in the present embodiment, the discharging processing time period (the time period during which mode B is carried out) is set within a time frame (a "discharging • negative torque region" shown in FIG. 27) where output torque from motor 3 is negative and electric power in smoothing capacitor C0 is discharged when the speed of motor 3 is lower than a prescribed rotation speed (for example, 2000 rpm in the example shown in FIG. 27). Therefore, even though motor 3 is rotating, in the discharging processing (while mode B is being carried out), motor 3 is caused to generate negative torque to encourage the vehicle to stop while smoothing capacitor C0 is discharged.

<Functional Block>

Figure 28:
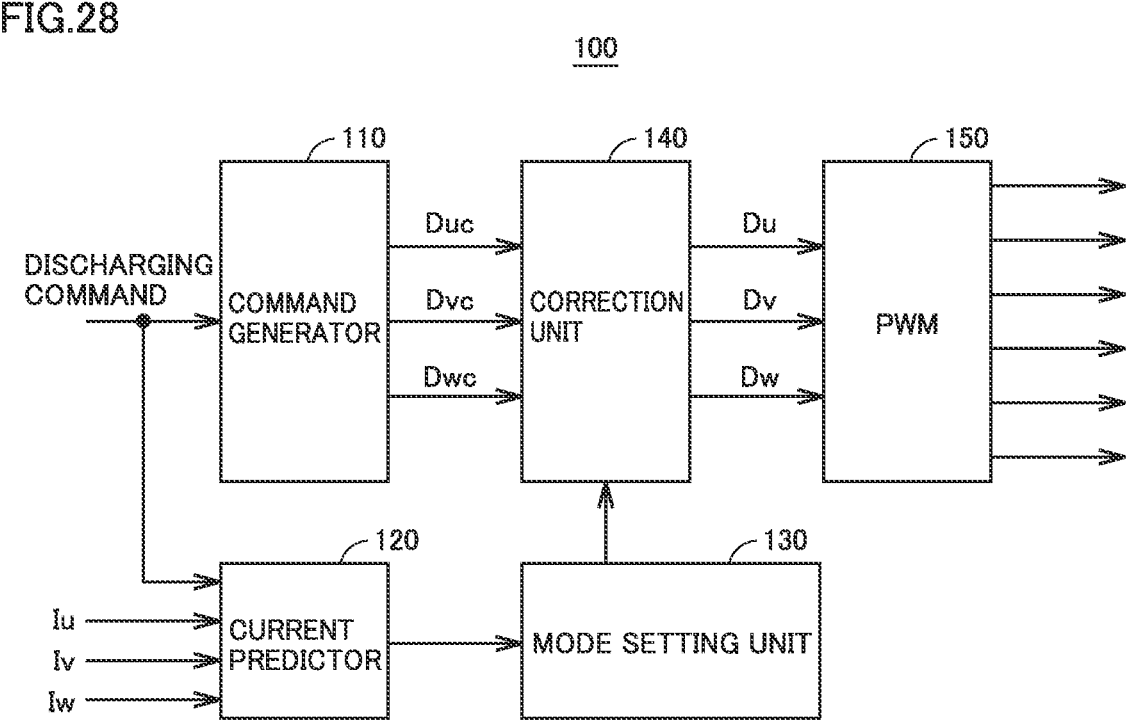
FIG. 28 is a functional block diagram of a control circuit.

FIG. 28 is a functional block diagram of control circuit 100 in control by control circuit 100, of discharging of smoothing capacitor C0. Control circuit 100 includes a command generator 110, a current predictor 120, a mode setting unit, a correction unit 140, and a PWM controller 150.

A command for discharging of smoothing capacitor C0 (which is also referred to as a "discharging command" below) is provided to command generator 110 and current predictor 120 as the vehicle stops operating or a fault occurs.

When command generator 110 receives the discharging command, it generates a U-phase duty command value Duc, a V-phase duty command value Dvc, and a W-phase duty command value Dwc for alternate and periodic switching between all-phase upper on control and all-phase lower on control. Duty command values Duc, Dvc, and Dwc are in phase with one another and set to 50%. Command generator 110 outputs generated duty command values Duc, Dvc, and Dwc to correction unit 140.

When current predictor 120 receives the discharging command, it predicts phase currents Iu, Iv, and Iw in a next operation cycle of PWM control based on a history of phase currents Iu, Iv, and Iw detected by current sensors 31 to 33 and outputs a result of prediction to a mode setting unit 130 together with the result of detection by current sensors 31 to 33.

Mode setting unit 130 specifies patterns 1 to 6 of combination of positive and negative phase currents Iu, Iv, and Iw based on the result of prediction of phase currents Iu, Iv, and Iw and sets the order of processing and contents of processing in modes A, B, and C described above based on the specified pattern. How to set the order of processing and the contents of processing in modes A, B, and C are as described already.

Correction unit 140 corrects 50% duty command values Duc, Dvc, and Dwc in phase obtained from command generator 110 based on the order of processing and the contents of processing in modes A, B, and C obtained from mode setting unit 130. Correction unit 140 outputs corrected duty command values Du, Dv, and Dw to PWM controller 150.

PWM controller 150 controls switching elements Q1 to Q6 of inverter 20 based on corrected duty command values Du, Dv, and Dw obtained from correction unit 140. Control described with reference to FIGS. 3 to 26 above is thus carried out so that smoothing capacitor C0 is discharged.

<Flowchart>

Figure 29:
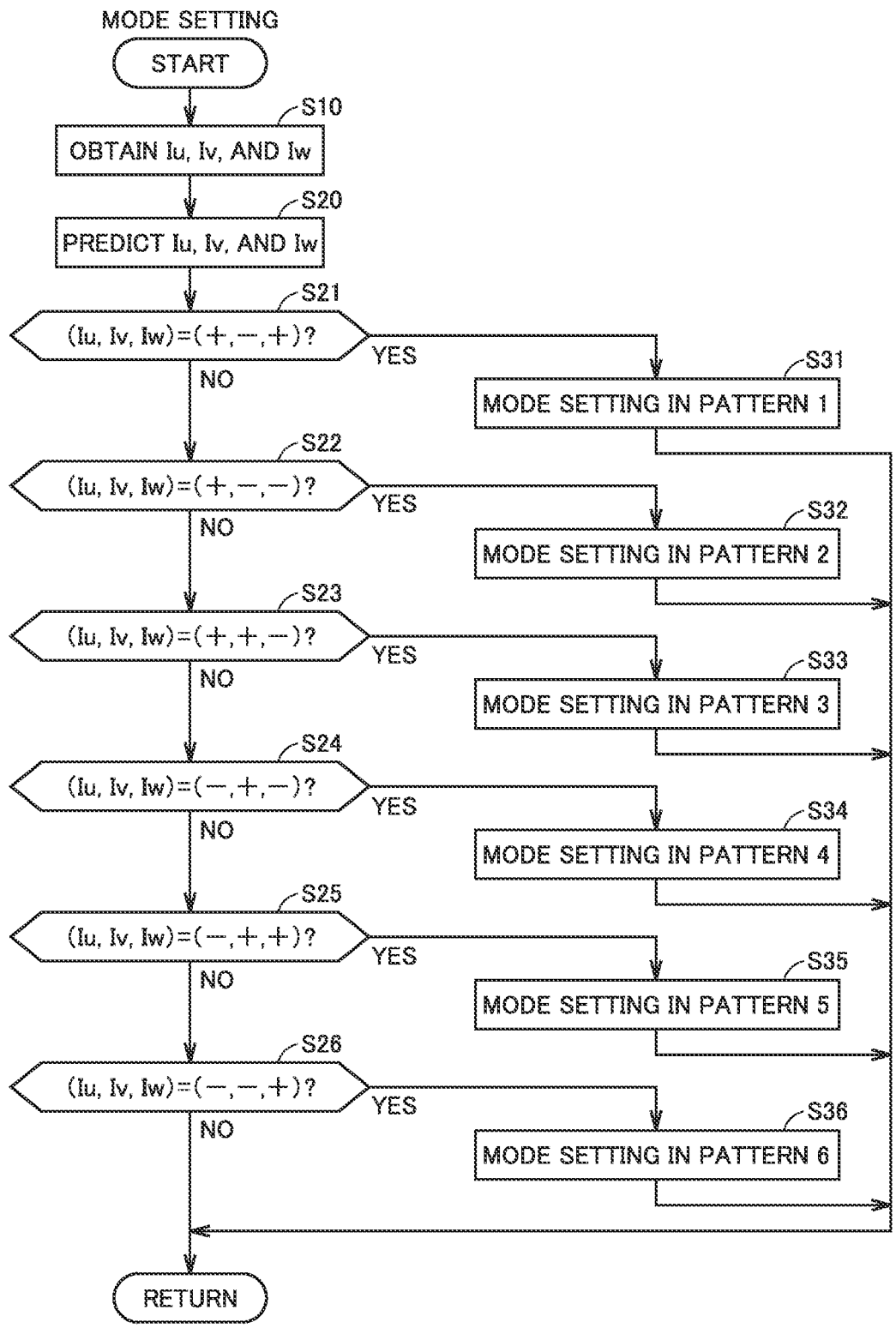
FIG. 29 is a flowchart (No. 1) of the control circuit.

FIG. 29 is a flowchart showing an exemplary processing procedure when control circuit 100 controls discharging of smoothing capacitor C0. The flowchart shown in FIG. 29 is repeatedly performed in prescribed operation cycles while system main relay SMR is open.

Control circuit 100 obtains phase currents Iu, Iv, and Iw detected by current sensors 31 to 33 (step S10).

Then, control circuit 100 predicts phase currents Iu, Iv, and Iw in a next operation cycle of PWM control based on the history of phase currents Iu, Iv, and Iw detected by current sensors 31 to 33 (step S20).

Then, control circuit 100 determines under which of patterns 1 to 6 described above the combination (Iu, Iv, Iw) of positive and negative phase currents Iu, Iv, and Iw predicted in step S20 falls (step S21 to S26). Then, control circuit 100 makes mode setting described with reference to FIGS. 3 to 26 above in accordance with the determined combination of positive and negative phase currents Iu, Iv, and Iw (steps S31 to S36).

For example, when the combination (Iu, Iv, Iw) of positive and negative phase currents Iu, Iv, and Iw falls under (+, −, +) (YES in step S21), control circuit 100 controls discharging of smoothing capacitor C0 by making mode setting in pattern 1 shown in FIGS. 3 to 6 described above (step S31). When the combination (Iu, Iv, Iw) of positive and negative phase currents Iu, Iv, and Iw falls under (+, −, −) (YES in step S22), control circuit 100 controls discharging of smoothing capacitor C0 by making mode setting in pattern 2 shown in FIGS. 7 to 10 described above (step S32). This is also applicable to other combinations.

As described above, in discharging of electric power in smoothing capacitor C0, control circuit 100 according to the present embodiment alternately and periodically switches between all-phase upper on control and all-phase lower on control. At this time, control circuit 100 sets the duty command value for each phase of inverter 20 to 50% such that the period of all-phase upper on control with respect to one switching cycle (the total of one all-phase upper on control period and one all-phase lower on control period) is set substantially to 50%. Thus, the voltage applied to motor 3 can be set substantially to 0 volt so that electric power in smoothing capacitor C0 is not supplied to motor 3.

Then, during a period during which switching between all-phase upper on control and all-phase lower on control is made, control circuit 100 according to the present embodiment sets first dead time DT1 (mode A), the discharging processing time period (mode B), and second dead time DT2 (mode C) in this order or the order reverse thereto as described above. Therefore, smoothing capacitor C0 can be discharged earlier and more reliably than in an example where an all-phase off period is provided during the period during which switching between all-phase upper on control and all-phase lower on control is made.

Specifically, if an all-off period is set during the period during which switching between all-phase upper on control and all-phase lower on control is made, there is such a concern that, while motor 3 is being rotated by energy for travel of the vehicle, smoothing capacitor C0 is charged with regenerative power from motor 3 through inverter 20 throughout the all-off period, and under the influence thereof, electric power in smoothing capacitor C0 cannot be discharged early.

In contrast, control circuit 100 according to the present embodiment does not set the all-off period during the period during which switching between all-phase upper on control and all-phase lower on control is made but sets first dead time DT1, a discharging processing period, and second dead time DT2 in this order or the order reverse thereto as described above. In any of first dead time DT1, the discharging processing time period, and second dead time DT2, smoothing capacitor C0 is not charged with regenerative power from motor 3 as described above. Furthermore, in the discharging processing time period (mode B), smoothing capacitor C0 is discharged even when motor 3 is in a regenerative state. Consequently, smoothing capacitor C0 can be discharged earlier and more reliably without a dedicated discharging circuit.

Furthermore, in the present embodiment, the discharging processing time period (the time period during which mode B is carried out) described above is adjusted in advance to a time period during which output torque from motor 3 is negative and electric power in smoothing capacitor C0 is discharged while motor 3 is rotating (see FIG. 27 described above). Therefore, in the discharging processing (while mode B is being carried out), smoothing capacitor C0 can more reliably be discharged without generation of positive torque by motor 3.

In control of discharging of smoothing capacitor C0 in the present embodiment, a detection signal from a resolver (not shown) that detects an angle of rotation of motor 3 is not used. Therefore, even when control circuit 100 is unable to know an angle of rotation of motor 3 due to disconnection of a signal line that connects the resolver and control circuit 100 to each other, smoothing capacitor C0 can be discharged.

[Modification]

In the embodiment described above, a cycle of switching between the all-phase upper on control period and the all-phase lower on control period has been set to a constant (fixed) cycle. In contrast, in the present modification, the cycle of switching between the all-phase upper on control period and the all-phase lower on control period is varied in accordance with magnitude of the current that flows in motor 3.

Figure 30:
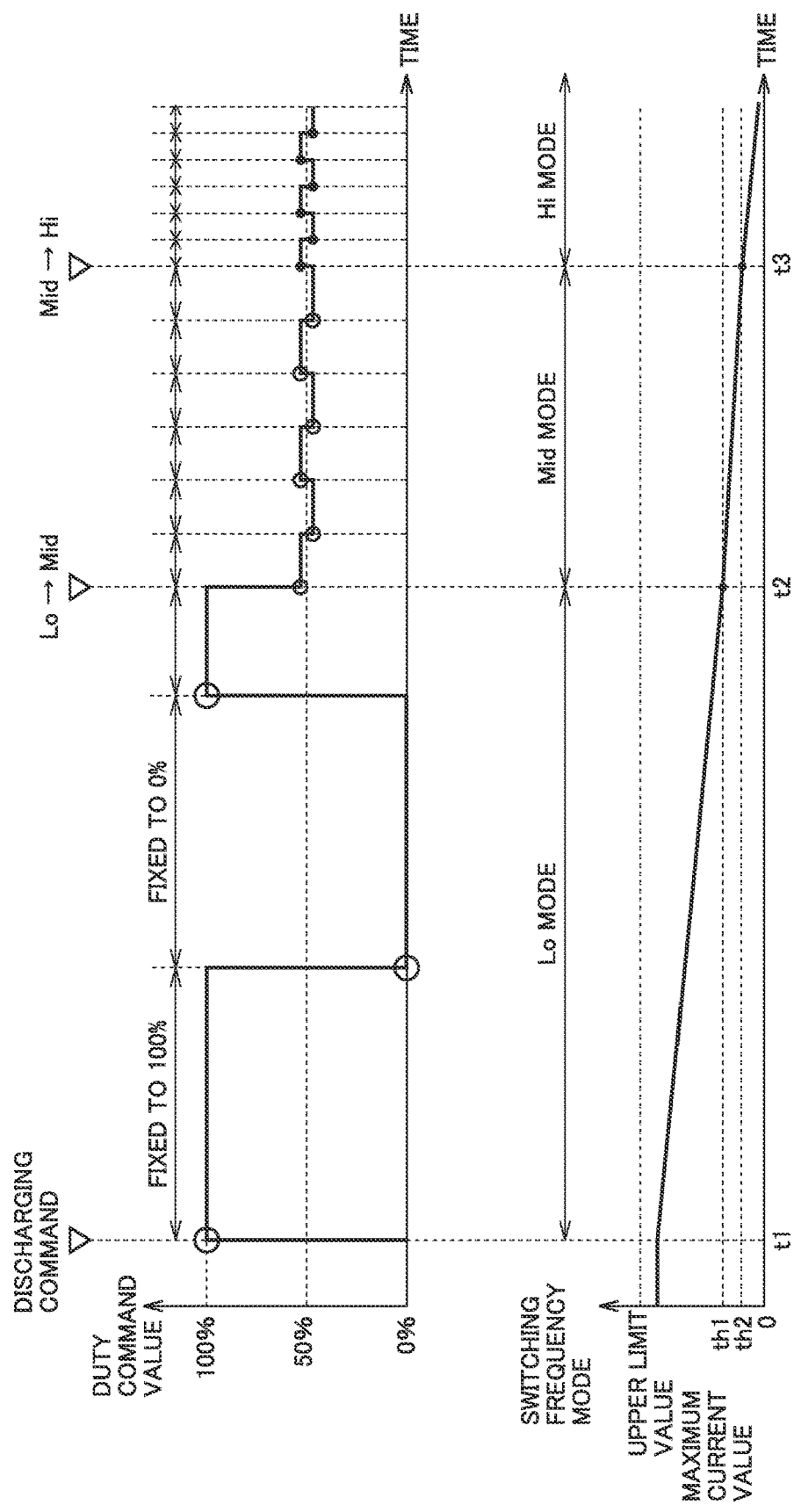
FIG. 30 is a timing chart showing an exemplary manner of change of a cycle of switching between an all-phase upper on control period and an all-phase lower on control period.

FIG. 30 is a timing chart showing an exemplary manner of change of a cycle of switching between the all-phase upper on control period and the all-phase lower on control period according to the present modification. FIG. 30 shows in an upper tier, a duty command value for each phase of inverter 20. FIG. 30 shows in a lower tier, maximum values of phase currents Iu, Iv, and Iw (maximum current values) as the current that flows in motor 3.

At time t1 when control circuit 100 receives the discharging command, the maximum current value is larger than a first threshold value th1. This state arouses a concern about the high rotation speed of motor 3 and generation of positive torque by motor 3.

When the maximum current value is larger than first threshold value th1, control circuit 100 sets a switching frequency mode to a Lo mode. In the Lo mode, the frequency of switching between the all-phase upper on control period and the all-phase lower on control period is set to a frequency f0 lower than carrier frequency fc. In other words, in the Lo mode, switching between a period during which the duty command value is fixed to 100% (the all-phase upper on control period) and a period during which the duty command value is fixed to 0% (the all-phase lower on control period) is made in cycles longer than a cycle (=1/fc) determined by carrier frequency fc.

Thus, in a state where the maximum current value is larger than first threshold value th1 (the rotation speed of motor 3 is high), a frequency of switching between the all-phase upper on control period and the all-phase lower on control period is lowered, and accordingly, a frequency of discharging of smoothing capacitor C0 in the discharging processing is lowered. Therefore, generation of positive torque by motor 3 can more readily be suppressed.

An amount of discharging of smoothing capacitor C0 in single discharging processing is dependent on the maximum current value. Therefore, in the Lo mode, though the frequency of the discharging processing is lowered, the amount of discharging of smoothing capacitor C0 in single discharging processing is large, and hence, as a whole, the amount of discharging of smoothing capacitor C0 does not excessively decrease.

Thereafter, when the rotation speed of motor 3 becomes lower and the maximum current value decreases, possibility of generation of positive torque by motor 3 becomes lower. Then, when the maximum current value becomes smaller than first threshold value th1 at time t2, control circuit 100 switches the switching frequency mode to a Mid mode. In the Mid mode, the frequency of switching between the all-phase upper on control period and the all-phase lower on control period is set to a frequency f1 higher than frequency f0 in the Lo mode. Specifically, in the Mid mode, the frequency of switching between the all-phase upper on control period and the all-phase lower on control period is matched with carrier frequency fc and then carrier frequency fc is set to frequency f1.

Thus, while the maximum current value is smaller than first threshold value th1, the frequency of switching between the all-phase upper on control period and the all-phase lower on control period is made higher than that while the maximum current value is equal to or larger than first threshold value th1, and accordingly, the frequency of discharging of smoothing capacitor C0 in the discharging processing is made higher. Therefore, though the amount of discharging of smoothing capacitor C0 in single discharging processing is small, the amount of discharging of smoothing capacitor C0 is secured as a whole.

Thereafter, when the rotation speed of motor 3 further lowers and the maximum current value further decreases, discharging of smoothing capacitor C0 by means of the current that flows in motor 3 cannot be expected. Then, when the maximum current value becomes smaller than a second threshold value th2 (th2<th1) at time t3, control circuit 100 switches the switching frequency mode to a Hi mode. In the Hi mode, the frequency of switching between the all-phase upper on control period and the all-phase lower on control period is set to a frequency f2 higher than frequency f1 in the Mid mode. Specifically, in the Hi mode, the frequency of switching between the all-phase upper on control period and the all-phase lower on control period is matched with carrier frequency fc, and then carrier frequency fc is set to frequency f2. Thus, while the maximum current value is smaller than second threshold value th2, electric power in smoothing capacitor C0 can be consumed by switching loss in inverter 20.

In the Hi mode, electric power in smoothing capacitor C0 is consumed by switching loss in inverter 20 as described above. Therefore, even when a cable that connects inverter 20 and motor 3 to each other is disconnected, smoothing capacitor C0 can be discharged.

FIG. 31 is a flowchart showing an exemplary processing procedure performed when control circuit 100 sets the switching frequency mode while control circuit 100 controls discharging of smoothing capacitor C0. The flowchart shown in FIG. 31 is repeatedly performed in prescribed operation cycles while discharging of smoothing capacitor C0 is controlled.

Control circuit 100 obtains phase currents Iu, Iv, and Iw detected by current sensors 31 to 33 (step S60). Then, control circuit 100 determines relation of magnitude of the maximum values of phase currents Iu, Iv, and Iw (=maximum current values) detected by current sensors 31 to 33 and first threshold value th1 and second threshold value th2 described above (steps S61 to S63).

Then, control circuit 100 sets the switching frequency mode as described with reference to FIG. 30 above in accordance with a result of determination of relation of magnitude of the maximum current value and first threshold value th1 and second threshold value th2 (steps S71 to S73). Specifically, when the maximum current value is larger than first threshold value th1 (YES in step S61), control circuit 100 sets the switching frequency mode to the Lo mode described above (step S71). When the maximum current value is smaller than first threshold value th1 and larger than second threshold value th2 (YES in step S62), control circuit 100 sets the switching frequency mode to the Mid mode described above (step S72). When the maximum current value is smaller than second threshold value th2 (YES in step S63), control circuit 100 sets the switching frequency mode to the Hi mode described above (step S73).

As described above, the cycle of switching between the all-phase upper on control period and the all-phase lower on control period may be varied in accordance with magnitude of the current that flows in motor 3.

Power modules 21, 22, and 23 do not have to be implemented as separate modules but may be implemented as a single module.

Switching elements Q1 to Q6 may each be implemented by a metal oxide semiconductor field effect transistor (MOSFET). In this case, a body diode may be employed as diodes D1 to D6.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

The exemplary embodiment and the modification thereof described above are specific examples of aspects below.

(1) A power conversion system according to the present disclosure includes an inverter that converts electric power between a battery and a motor including three-phase stator coils, a positive electrode line and a negative electrode line that connect the battery and the inverter to each other, a smoothing capacitor arranged between the positive electrode line and the negative electrode line, and a control circuit that controls the inverter. The inverter includes three-phase switching units connected in parallel to one another between the positive electrode line and the negative electrode line and connected to the respective three-phase stator coils. Each of the three-phase switching units includes an upper switching element and a lower switching element connected in series in an order from the positive electrode line to the negative electrode line and an upper diode and a lower diode connected in anti-parallel to the upper switching element and the lower switching element, respectively. In release of charges in the smoothing capacitor, the control circuit alternately and periodically switches all of the three-phase switching units between all-phase upper on control in which the upper switching element is on and the lower switching element is off and all-phase lower on control in which the upper switching element is off and the lower switching element is on. During a period during which switching from one to the other of the all-phase upper on control and the all-phase lower on control is made, the control circuit controls states of the upper switching element and lower switching element of each phase as being different from the states in the all-phase upper on control and the all-phase lower on control, and controls, in an initial stage and a final stage of the period during which the switching is made, states of the upper switching element and lower switching element to be set to a state in which both of the upper switching element and lower switching element of at least one phase are off and controls, during a period between the initial stage and the final stage, states of the upper switching element and lower switching element of all phases to be set to an upper on state in which the upper switching element is on and the lower switching element is off or to be set to a lower on state in which the upper switching element is off and the lower switching element is on.

According to the configuration in (1), during discharging of the smoothing capacitor, switching between all-phase upper on control and all-phase lower on control is alternately and periodically made. During the period between the initial stage and the final stage of the period during which switching between all-phase lower on control and all-phase upper on control is made, in at least one phase, the upper switching element and lower switching element are controlled to the upper on state in which the upper switching element is on and the lower switching element is off or to the lower on state in which the upper switching element is off and the lower switching element is on. With this control, the smoothing capacitor is discharged even while the motor is being rotated with energy for travel of the vehicle. Consequently, the smoothing capacitor can be discharged early without a dedicated discharging circuit.

(2) In one aspect, with a phase of three phases of the switching units in which a current flows in a direction from the motor toward the inverter being defined as a negative current phase and with a phase of the three phases in which a current flows in a direction from the inverter toward the motor being defined as a positive current phase, during the period during which switching from one to the other of the all-phase lower on control and the all-phase upper on control is made, the control circuit performs, for a prescribed time period, discharging processing for setting the negative current phase to the lower on state and for setting the positive current phase to the upper on state.

According to the configuration in (2), during the period between the initial stage and the final stage of the period during which switching between all-phase lower on control and all-phase upper on control is made, discharging processing for setting the negative current phase to the lower on state and setting the positive current phase to the upper on state is performed for the prescribed time period. While the discharging processing is performed, even while a motor generator is being rotated with energy for travel of the vehicle, the smoothing capacitor is discharged. Consequently, the smoothing capacitor can be discharged early without a dedicated discharging circuit.

(3) In one aspect, when the control circuit switches from the all-phase lower on control to the all-phase upper on control, the control circuit performs first dead time processing in which, while a negative current phase is maintained in the lower on state, both of the upper switching element and the lower switching element of a positive current phase are set to off, performs the discharging processing for a prescribed time period after the control circuit performs the first dead time processing, performs, after the control circuit performs the discharging processing, second dead time processing in which, while the positive current phase is maintained in the upper on state, both of the upper switching element and the lower switching element of the negative current phase are set to off, and carries out the all-phase upper on control by switching the negative current phase to the upper on state while the control circuit maintains the positive current phase in the upper on state, after the control circuit performs the second dead time processing.

(4) In one aspect, when the control circuit switches from the all-phase upper on control to the all-phase lower on control, the control circuit performs the second dead time processing, performs the discharging processing for the prescribed time period after the control circuit performs the second dead time processing, performs the first dead time processing after the control circuit performs the discharging processing, and carries out the all-phase lower on control by switching the positive current phase to the lower on state while the control circuit maintains the negative current phase in the lower on state, after the control circuit performs the first dead time processing.

According to the configuration in (3) and (4), during the period during which switching between all-phase lower on control and all-phase upper on control is made, the first dead time processing, the discharging processing period, and the second dead time processing are set to this order or the order reverse thereto. The smoothing capacitor is not charged with regenerative power from the motor while one of the first dead time processing, the discharging processing, and the second dead time processing is being performed. Furthermore, while the discharging processing is being performed, the smoothing capacitor is discharged even while the motor is rotating. Consequently, the smoothing capacitor can be discharged early.

(5) In one aspect, the prescribed time period is adjusted in advance to a time period during which output torque from the motor is negative and electric power in the smoothing capacitor is discharged while the motor is rotating.

According to the configuration in (5), the prescribed time period (the time period during which the discharging processing is performed) is adjusted in advance to the time period during which output torque from the motor is negative and electric power in the smoothing capacitor is discharged while the motor is rotating. Therefore, while the discharging processing is being performed, electric power in the smoothing capacitor can be discharged without generation of positive torque by the motor.

(6) In one aspect, in discharging of electric power in the smoothing capacitor, the control circuit sets a cycle of switching between the all-phase lower on control and the all-phase upper on control to be longer as a current that flows in the motor is higher.

According to the configuration in (6), in view of possibility of generation of positive torque by the motor while the current that flows in the motor during discharging of the smoothing capacitor is high (that is, the rotation speed of the motor is high), as the current that flows in the motor is higher, the cycle of switching between all-phase lower on control and all-phase upper on control is set to be longer. Thus, when the rotation speed of the motor is high, the frequency of switching between all-phase upper on control and all-phase lower on control is lowered, and accordingly, the frequency of discharging of the smoothing capacitor in the discharging processing is lowered. Therefore, even while the current that flows in the motor is high (when the rotation speed of the motor is high), generation of positive torque by the motor can more readily be suppressed.

According to the configuration in (6), in view of the fact that discharging of the smoothing capacitor by means of the current that flows in the motor cannot be expected while the current that flows in the motor during discharging of the smoothing capacitor is low (that is, the rotation speed of the motor is low), the cycle of switching between all-phase lower on control and all-phase upper on control is set to be shorter as the current that flows in the motor is lower. Thus, while the current that flows in the motor is low (the rotation speed of the motor is low), electric power in the smoothing capacitor can be consumed by switching loss in the inverter.

(7) In one aspect, in discharging of electric power in the smoothing capacitor, the control circuit sets the cycle of switching between the all-phase lower on control and the all-phase upper on control to a first cycle when the current flowing in the motor has a value between a first threshold value and a second threshold value smaller than the first threshold value. The control circuit sets the cycle of switching between the all-phase lower on control and the all-phase upper on control to a second cycle longer than the first cycle when the current flowing in the motor is larger than the first threshold value. The control circuit sets the cycle of switching between the all-phase lower on control and the all-phase upper on control to a third cycle shorter than the first cycle when the current flowing in the motor is smaller than the second threshold value.

According to the configuration in (7), when the current that flows in the motor during discharging of the smoothing capacitor is larger than the first threshold value (that is, the rotation speed of the motor is high), the cycle of switching between all-phase lower on control and all-phase upper on control is set to the second cycle longer than the first cycle. Thus, while the rotation speed of the motor is high, the frequency of switching between all-phase upper on control and all-phase lower on control is lowered, and accordingly, the frequency of discharging of the smoothing capacitor in the discharging processing is lowered. Therefore, generation of positive torque by the motor can more readily be suppressed.

According to the configuration in (7), when the current that flows in the motor during discharging of the smoothing capacitor is smaller than the second threshold value (that is, the rotation speed of the motor is low), the cycle of switching between all-phase lower on control and all-phase upper on control is set to the third cycle shorter than the first cycle. Thus, even when the current that flows in the motor is low (the rotation speed of the motor is low), electric power in the smoothing capacitor can be consumed by switching loss in the inverter.

What is claimed is:

1. A power conversion system comprising:
an inverter that converts electric power between a battery and a motor including three-phase stator coils;
a positive electrode line and a negative electrode line that connect the battery and the inverter to each other;
a smoothing capacitor arranged between the positive electrode line and the negative electrode line; and
a control circuit that controls the inverter, wherein
the inverter includes three-phase switching units connected in parallel to one another between the positive electrode line and the negative electrode line and connected to the respective three-phase stator coils,
each of the three-phase switching units includes
an upper switching element and a lower switching element connected in series in an order from the positive electrode line to the negative electrode line, and
an upper diode and a lower diode connected in anti-parallel to the upper switching element and the lower switching element, respectively,
in release of charges in the smoothing capacitor,
the control circuit
alternately and periodically switches all of the three-phase switching units between all-phase upper on control in which the upper switching element is on and the lower switching element is off and all-phase lower on control in which the upper switching element is off and the lower switching element is on, and
controls, during a period during which switching from one to the other of the all-phase upper on control and the all-phase lower on control is made, states of the upper switching element and lower switching element of each phase as being different from the states in the all-phase upper on control and the all-phase lower on control, and controls, in an initial stage and a final stage of the period during which the switching is made, states of the upper switching element and lower switching element to be set to a state in which both of the upper switching element and lower switching element of at least one phase are off and controls, during a period between the initial stage and the final stage, states of the upper switching element and lower switching element of all phases to be set to an upper on state in which the upper switching element is on and the lower switching element is off or to be set to a lower on state in which the upper switching element is off and the lower switching element is on.

2. The power conversion system according to claim 1, wherein
with a phase of three phases of the switching units in which a current flows in a direction from the motor toward the inverter being defined as a negative current phase and with a phase of the three phases in which a current flows in a direction from the inverter toward the motor being defined as a positive current phase, during the period during which switching from one to the other of the all-phase lower on control and the all-phase upper on control is made, the control circuit performs, for a prescribed time period, discharging processing for setting the negative current phase to the lower on state and for setting the positive current phase to the upper on state.

3. The power conversion system according to claim 1, wherein
when the control circuit switches from the all-phase lower on control to the all-phase upper on control, the control circuit
performs first dead time processing in which, while a negative current phase is maintained in the lower on state, both of the upper switching element and the lower switching element of a positive current phase are set to off,
performs the discharging processing for a prescribed time period after the control circuit performs the first dead time processing,
performs, after the control circuit performs the discharging processing, second dead time processing in which, while the positive current phase is maintained in the upper on state, both of the upper switching element and the lower switching element of the negative current phase are set to off, and
carries out the all-phase upper on control by switching the negative current phase to the upper on state while the control circuit maintains the positive current phase in the upper on state, after the control circuit performs the second dead time processing.

4. The power conversion system according to claim 3, wherein
when the control circuit switches from the all-phase upper on control to the all-phase lower on control, the control circuit
performs the second dead time processing,
performs the discharging processing for the prescribed time period after the control circuit performs the second dead time processing,
performs the first dead time processing after the control circuit performs the discharging processing, and
carries out the all-phase lower on control by switching the positive current phase to the lower on state while the control circuit maintains the negative current phase in the lower on state, after the control circuit performs the first dead time processing.

5. The power conversion system according to claim 2, wherein
the prescribed time period is adjusted in advance to a time period during which output torque from the motor is negative and electric power in the smoothing capacitor is discharged while the motor is rotating.

6. The power conversion system according to claim 1, wherein
in discharging of electric power in the smoothing capacitor, the control circuit sets a cycle of switching between the all-phase lower on control and the all-phase upper on control to be longer as a current that flows in the motor is higher.

7. The power conversion system according to claim 6, wherein
in discharging of electric power in the smoothing capacitor, the control circuit
sets the cycle of switching between the all-phase lower on control and the all-phase upper on control to a first cycle when the current flowing in the motor has a value between a first threshold value and a second threshold value smaller than the first threshold value,
sets the cycle of switching between the all-phase lower on control and the all-phase upper on control to a second cycle longer than the first cycle when the current flowing in the motor is larger than the first threshold value, and sets the cycle of switching between the all-phase lower on control and the all-phase upper on control to a third cycle shorter than the first cycle when the current flowing in the motor is smaller than the second threshold value.

\* \* \* \* \*